(12) United States Patent
Zhu et al.

(10) Patent No.: US 12,119,767 B2
(45) Date of Patent: Oct. 15, 2024

(54) MULTILEVEL POWER CONVERSION SYSTEM AND METHOD

(71) Applicant: Huawei Digital Power Technologies Co., Ltd., Shenzhen (CN)

(72) Inventors: Huibin Zhu, Plano, TX (US); Dianbo Fu, Frisco, TX (US); Heping Dai, Plano, TX (US); Liming Ye, Plano, TX (US)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 17/660,456

(22) Filed: Apr. 25, 2022

(65) Prior Publication Data
US 2022/0255417 A1 Aug. 11, 2022

Related U.S. Application Data

(63) Continuation of application No. PCT/US2019/058188, filed on Oct. 25, 2019.

(51) Int. Cl.
*H02P 27/06* (2006.01)
*B60L 50/60* (2019.01)
(Continued)

(52) U.S. Cl.
CPC .............. *H02P 27/06* (2013.01); *B60L 50/60* (2019.02); *H02M 3/33584* (2013.01);
(Continued)

(58) Field of Classification Search
CPC ...... H02P 27/06; B60L 50/60; B60L 2210/10; B60L 2210/30; B60L 2210/40;
(Continued)

(56) References Cited

U.S. PATENT DOCUMENTS

| | | | |
|---|---|---|---|
| 9,520,792 B2* | 12/2016 | He | H02M 3/33569 |
| 2012/0032622 A1* | 2/2012 | Lipo | H02P 21/0089 |
| | | | 318/400.27 |
| 2019/0126763 A1 | 5/2019 | Najmabadi et al. | |
| 2021/0178919 A1* | 6/2021 | Yeo | H02J 7/02 |

FOREIGN PATENT DOCUMENTS

| | | |
|---|---|---|
| CN | 105743175 A | 7/2016 |
| EP | 0907238 A1 | 4/1999 |

(Continued)

OTHER PUBLICATIONS

W. Warren Chen et al., "Application of Three-Phase Unfolder in Electric Vehicle Drivetrain" 2015 IEEE 16th Workshop on Control and Modeling for Power Electronics (COMPEL), IEEE, CP033216887, Jul. 12, 2015, 8 pages.

(Continued)

*Primary Examiner* — Zoheb S Imtiaz
(74) *Attorney, Agent, or Firm* — Slater Matsil, LLP

(57) ABSTRACT

A system includes a first power conversion device connected to a first power source, a first isolated power conversion device connected to the first power source, and a second power conversion device connected to the first isolated power conversion device, wherein outputs of the first power conversion device and outputs of the second power conversion device are connected in series, and series-connected outputs of the first power conversion device and the second power conversion device are configured to drive a motor.

18 Claims, 22 Drawing Sheets

(51) Int. Cl.
    *H02M 1/00*      (2007.01)
    *H02M 3/335*     (2006.01)
    *H02M 7/483*     (2007.01)
(52) U.S. Cl.
    CPC ......... *H02M 7/483* (2013.01); *B60L 2210/10* (2013.01); *B60L 2210/30* (2013.01); *B60L 2210/40* (2013.01); *B60L 2220/00* (2013.01); *H02M 1/007* (2021.05); *H02M 1/0074* (2021.05)
(58) Field of Classification Search
    CPC ........... B60L 2220/00; H02M 3/33584; H02M 7/483; H02M 1/0074
    See application file for complete search history.

(56) References Cited

FOREIGN PATENT DOCUMENTS

| EP | 3460975 A1 | 3/2019 |
|----|------------|--------|
| JP | 2016019298 A | 2/2016 |
| WO | 2019199964 A1 | 10/2019 |

OTHER PUBLICATIONS

Noreen Wong et al., "A Review of Bidirectional On-Board Charge Topologies for Plugin Vehicles" IEEE Canadian Conference on Electrical and Computer Engineering (CCECE), XP032257079, Apr. 29, 2012, 6 pages.

\* cited by examiner

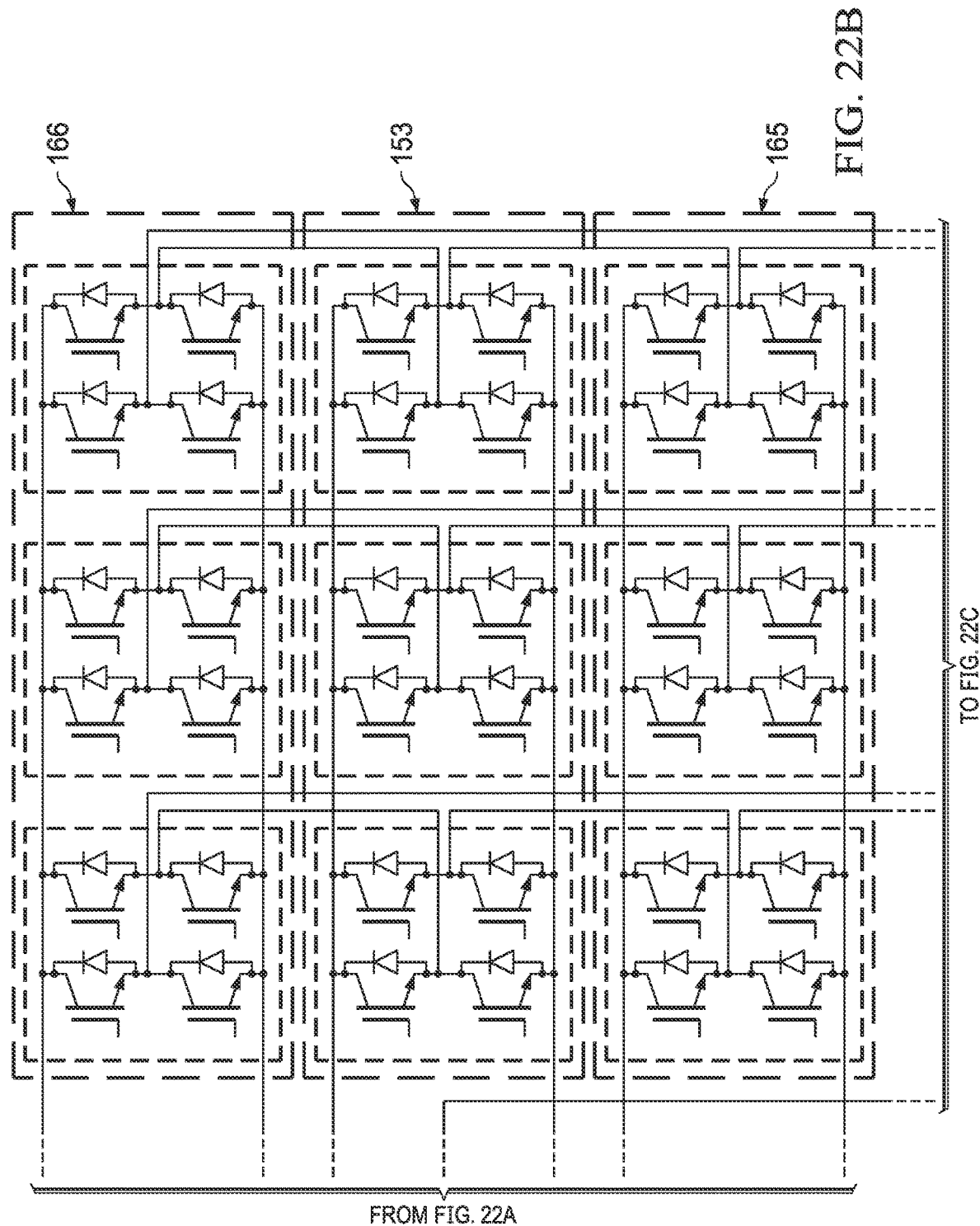

MULTILEVEL POWER CONVERSION SYSTEM AND METHOD

CROSS REFERENCE TO RELATED APPLICATIONS

This application is a continuation of Application No. PCT/US2019/058188, entitled "Multilevel Power Conversion System and Method," filed on Oct. 25, 2019, which application is hereby incorporated herein by reference.

TECHNICAL FIELD

The present disclosure relates to a high-efficiency power conversion system, and, in particular embodiments, to an integrated motor drive and isolated battery charger system.

BACKGROUND

The power electronics industry has experienced rapid growth due to continuous improvements in the exponential development of new technologies. As the power electronics technologies further advance, on-board battery chargers have become a key element for some new energy applications. One of the most important new energy applications is electric vehicles (EV). Different EVs are equipped with different capacity and voltage batteries. The EVs need suitable chargers for charging a variety of batteries.

An on-board battery charger comprises electrical circuits for converting alternating current (AC) power into direct current (DC) power. The on-board battery charger may include an AC/DC stage and a DC/DC stage. The inputs of the AC/DC stage are connected to the AC utility line. The AC/DC stage is employed to convert the AC input voltage from the AC utility line to a suitable DC bus voltage. The AC/DC stage may comprise a variety of electromagnetic interference (EMI) filters, a bridge rectifier formed by four diodes and a power factor correction circuit.

The EMI filter is employed to reduce high frequency noise that may cause interference with other devices of the on-board battery charger. As a result of employing the EMI filters, the on-board battery charger may meet various EMI regulations. The bridge rectifier converts an AC voltage into a full-wave rectified DC voltage. Such a full-wave rectified DC voltage provides a DC input voltage for the power factor correction circuit. The power factor correction circuit may be implemented a suitable power converter such as a boost converter. By employing an appropriate control circuit, the boost converter is capable of shaping the input line current to be sinusoidal and in phase with the sinusoidal input voltage of the AC input source. As a result, the power factor of the AC/DC stage may be close to unity as required by a variety of international standards The DC/DC stage is connected between the outputs of the AC/DC stage and a plurality of batteries. The DC/DC stage may comprise an isolated DC/DC power converter having one primary winding, a secondary winding and a secondary rectifier for converting the DC bus voltage into a DC voltage for charging the EV battery.

The power system of the EV is sensitive to component dimensions, weight and power conversion efficiency. There is a need to integrate the on-board charger with the motor drive unit to further reduce the size of the power system of the EV.

SUMMARY

These and other problems are generally solved or circumvented, and technical advantages are generally achieved, by preferred embodiments of the present disclosure which provide an integrated motor drive and isolated battery charger system.

In accordance with an embodiment, a system comprises a first power conversion device connected to a first power source, a first isolated power conversion device connected to the first power source, and a second power conversion device connected to the first isolated power conversion device, wherein outputs of the first power conversion device and outputs of the second power conversion device are connected in series and configured to drive a motor.

The first power conversion device is a first inverter. The second power conversion device is a second inverter. The first isolated power conversion device is a three-level inductor-inductor-capacitor (LLC) converter.

The first isolated power conversion device comprises a first primary switching network, a first resonant tank, a first transformer and a secondary rectifier connected in cascade.

The first isolated power conversion device comprises a first primary switching network, a first resonant tank, a first transformer, a second primary switching network, a second resonant tank, a second transformer and a secondary rectifier, and wherein the first primary switching network, the first resonant tank and a primary winding of the first transformer are connected in cascade, wherein the second primary switching network, the second resonant tank and a primary winding of the second transformer are connected in cascade, and wherein a secondary winding of the first transformer and a secondary winding of the second transformer are connected in series and further connected to the secondary rectifier.

The first isolated power conversion device comprises a first primary switching network, a first resonant tank, a first transformer and a plurality of secondary rectifiers, and wherein the plurality of secondary rectifiers is configured to provide isolated power for a plurality of inverting units of the second power conversion device.

The first power conversion device is a first inverter comprising a first inverting unit, a second inverting unit and a third inverting unit connected in parallel, and wherein each inverting unit of the first inverter includes two output terminals. The second power conversion device is a second inverter comprising a fourth inverting unit, a fifth inverting unit and a sixth inverting unit connected in parallel, and wherein each inverting unit of the second inverter includes two output terminals, wherein two output terminals of the first inverting unit and two output terminals of the fourth inverter unit of the second inverter are connected in series and further connected to a first phase of the motor, wherein two output terminals of the second inverting unit and two output terminals of the fifth inverter unit of the second inverter are connected in series and further connected to a second phase of the motor, and wherein two output terminals of the third inverting unit and two output terminals of the sixth inverter unit of the second inverter are connected in series and further connected to a third phase of the motor.

A common node of the first inverting unit and the fourth inverter unit is configured to be connected to a first phase of a three-phase power source. A common node of the second inverting unit and the fifth inverter unit is configured to be connected to a second phase of the three-phase power source. A common node of the third inverting unit and the sixth inverter unit is configured to be connected to a third phase of the three-phase power source, and wherein the three-phase power source is configured to charge the first power source through a power factor correction device formed by windings of the motor and switches of the second inverter.

The first power conversion device is a first inverter having three legs and three output terminals. The second power conversion device comprises a first inverting unit, a second inverting unit and a third inverting unit, wherein a first terminal of the first inverter is connected in series with outputs of the first inverting unit and further connected to a first phase of the motor, wherein a second terminal of the first inverter is connected in series with outputs of the second inverting unit and further connected to a second phase of the motor, and wherein a third terminal of the first inverter is connected in series with outputs of the third inverting unit and further connected to a third phase of the motor.

The first isolated power conversion device is an LLC converter comprising a primary winding, a first secondary winding, a second secondary winding and a third secondary winding, wherein the primary winding is connected to the first power source through a primary switching network, wherein the first secondary winding is connected to the first inverting unit through a first rectifier, wherein the second secondary winding is connected to the second inverting unit through a second rectifier, and wherein the third secondary winding is connected to the third inverting unit through a third rectifier.

The first power conversion device is a first inverter having three legs and three output terminals. The second power conversion device comprises a first inverting unit having two legs and a second inverting unit having two legs, a first output terminal of the first inverter being both connected to a first phase of the motor and connected in series with outputs of the first inverting unit, a second output terminal of the first inverter being both connected to a second phase of the motor and connected in series with outputs of the second inverting unit, and a third output terminal of the first inverter being connected directly to a third phase of the motor.

The first power conversion device is a first inverter having three legs and three output terminals. The second power conversion device comprises a first inverting unit having three legs and a second inverting unit having three legs, wherein a first output terminal of the first inverter is connected in series with outputs of the first inverting unit and further connected to a first phase of the motor, wherein a second output terminal of the first inverter is connected in series with outputs of the second inverting unit and further connected to a second phase of the motor, and wherein a third output terminal of the first inverter is connected to a third phase of the motor directly.

The first power conversion device is a first inverter comprising a first inverting unit, a second inverting unit and a third inverting unit connected in parallel, and wherein each inverting unit of the first inverter includes two output terminals. The second power conversion device comprises a second inverter and a third inverter, the second inverter comprising a fourth inverting unit, a fifth inverting unit and a sixth inverting unit connected in parallel, each inverting unit of the second inverter including two output terminals, the third inverter comprising a seventh inverting unit, an eighth inverting unit and a ninth inverting unit connected in parallel, each inverting unit of the third inverter including two output terminals, wherein two output terminals of the fourth inverter unit, two output terminals of the first inverting unit and two output terminals of the seventh inverter unit are connected in series and further connected to a first phase of the motor, wherein two output terminals of the second inverting unit, two output terminals of the fifth inverter unit and two output terminals of the eighth inverter unit are connected in series and further connected to a second phase of the motor, and wherein two output terminals of the third inverting unit, two output terminals of the sixth inverter unit and two output terminals of the ninth inverter unit are connected in series and further connected to a third phase of the motor.

In accordance with another embodiment, a system comprises a first inverter having inputs connected to a battery, an isolated power converter having inputs connected to the battery, and a second inverter having inputs connected to outputs of the isolated power converter, and outputs connected in series with outputs of the first inverter, wherein series-connected outputs of the first inverter and the second inverter are configured to drive a motor.

During a charging process of the battery, windings of the motor are configured to operate as inductors of a three-phase power factor correction converter.

The first inverter is a three-phase full-bridge inverter comprising three output terminals. The second inverter comprises a first inverting unit, a second inverting unit and a third inverting unit, wherein a first output terminal of the first inverter is connected in series with outputs of the first inverting unit and further connected to a first phase of the motor, wherein a second output terminal of the first inverter is connected in series with outputs of the second inverting unit and further connected to a second phase of the motor, and wherein a third output terminal of the first inverter is connected in series with outputs of the third inverting unit and further connected to a third phase of the motor.

The isolated power converter is an inductor-inductor-capacitor (LLC) power converter comprising a primary winding, a first secondary winding, a second secondary winding and a third secondary winding, wherein the primary winding is connected to the battery through a primary switching network, wherein the first secondary winding is connected to the first inverting unit through a first rectifier, wherein the second secondary winding is connected to the second inverting unit through a second rectifier, and wherein the third secondary winding is connected to the third inverting unit through a third rectifier.

In accordance with yet another embodiment, a method comprises driving a motor using a first inverter and a second inverter that are connected in series with one another, the first inverter being connected to a battery, the second inverter being connected to the battery through an isolated power converter, and charging the battery through a power factor correction device that includes windings of the motor and switches of the second inverter.

The method further comprises charging the battery using a three-phase power source, wherein the power factor correction device is configured to adjust input currents flowing into the power factor correction device to achieve a power factor that is within a threshold range of unity.

The first inverter comprises three legs, each of the three legs having an output terminal. The second inverter comprises a first inverting unit, a second inverting unit and a third inverting unit, wherein a first output terminal of the first inverter is connected in series with outputs of the first inverting unit and further connected to a first phase of the motor, wherein a second output terminal of the first inverter is connected in series with outputs of the second inverting unit and further connected to a second phase of the motor, and wherein a third output terminal of the first inverter is connected in series with outputs of the third inverting unit and further connected to a third phase of the motor. The isolated power converter comprises a primary winding, a first secondary winding, a second secondary winding and a third secondary winding, wherein the primary winding is connected to the battery through a primary switching network, wherein the first secondary winding is connected to the first inverting unit through a first rectifier, wherein the second secondary winding is connected to the second inverting unit through a second rectifier, and wherein the third secondary winding is connected to the third inverting unit through a third rectifier.

The method further comprises charging the battery using a three-phase power source, wherein the three-phase power source is connected to the first inverting unit through an EMI filter and a first inductor, wherein the three-phase power source is connected to the second inverting unit through the EMI filter and a second inductor, and wherein the three-phase power source is connected to the first inverting unit through the EMI filter and a third inductor.

An advantage of an embodiment of the present disclosure is a high-efficiency power conversion system combines a motor drive unit and an isolated battery charger in a single system, thereby improving the efficiency, reliability and cost of the power conversion system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 22A, 22B and 22C illustrate a schematic diagram of the power conversion system shown in FIG. 21 in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an integrated motor drive and isolated battery charger power conversion system. The present disclosure may also be applied, however, to a variety of power conversion systems. Hereinafter, various embodiments will be explained in detail with reference to the accompanying drawings.

Figure 1:
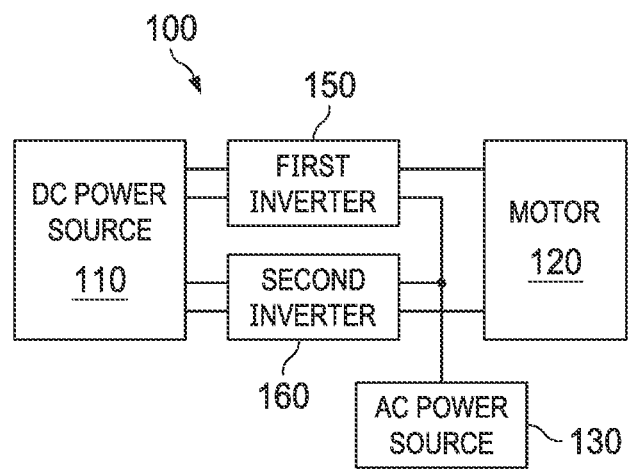
FIG. 1 illustrates a power conversion system in accordance with various embodiments of the present disclosure.

FIG. 1 illustrates a power conversion system in accordance with various embodiments of the present disclosure. The power conversion system 100 includes a direct current (DC) power source 110, a motor 120, an alternating current (AC) power source 130, a first inverter 150 and a second inverter 160. As shown in FIG. 1, the inputs of the first inverter 150 are connected to the DC power source 110. Likewise, inputs of the second inverter 160 are connected to the DC power source 110. The outputs of the first inverter 150 and the outputs of the second inverter 160 are connected in series and further connected to the motor 120. More particularly, a first output terminal of the first inverter 150 is connected to the motor 120 directly. A second output terminal of the first inverter 150 is connected to a first output terminal of the second inverter 160. A second output terminal of the second inverter 160 is connected to the motor 120 directly.

It should be noted that the connection between the inverters 150, 160, and the motor 120 is an exemplary implementation of two inverters connected in series to drive a motor. One of ordinary skill in the art would recognize many variations, alternatives, and modifications. For example, each inverter of the inverters shown in FIG. 1 may have more than two output terminals.

The AC power source 130 is connected to the common node of the first inverter 150 and the second inverter 160. Depending on different applications and design needs, the AC power source 130 can be implemented as either a three-phase AC power source or a single-phase AC power source. Likewise, the DC power source 110 can be implemented as either a single battery or a battery pack including a plurality of batteries connected in series and/or parallel. Depending on different applications and design needs, the motor 120 can be implemented as a three-phase motor, a two-phase motor or a single-phase motor.

In operation, the first inverter 150 is configured to convert a DC waveform from the DC power source 110 into a first pulse width modulated (PWM) waveform such as a three-level PWM waveform. The first inverter 150 can be implemented as any suitable inverting topologies such as a full-bridge inverter and the like. The detailed implementations of the first inverter 150 will be described below with respect to FIGS. 2-22.

In operation, an isolated power converter (not shown but illustrated in FIG. 2) may be employed to convert the DC waveform from the DC power source 110 into an intermediate DC waveform. The second inverter 160 is configured to convert the intermediate DC waveform into a second PWM waveform such as a three-level PWM waveform. The second inverter 160 can be implemented as any suitable inverting topologies such as a full-bridge inverter and the like. The isolated power converter may be implemented as any suitable isolation power conversion topologies such as an inductor-inductor-capacitor (LLC) resonant converter. The detailed implementations of the second inverter 160 and the isolated power converter will be described below with respect to FIGS. 2-22.

In operation, the first PWM waveform generated by the first inverter 150 and the second PWM waveform generated by the second inverter 160 are added together to form a multilevel PWM waveform such as a five-level PWM waveform. In some embodiments, the first PWM waveform is in sync with the second PWM waveform. The first PWM waveform and the second PWM waveform are added directly. In alternative embodiments, there is a phase shift between the first PWM waveform and the second PWM waveform. Due to the phase shift between the first PWM waveform and the second PWM waveform, the voltage waveform applied to the motor 120 is not a three-level PWM waveform. Instead, the voltage waveform applied to the motor 120 is a multilevel waveform. The number of levels of the multilevel waveform may vary depending on the degrees of the phase shift. In some embodiments, the number of levels of the multilevel waveform is equal to five.

One advantageous feature of having the multilevel waveform applied to the motor 120 is that the multilevel waveform follows a sinusoidal waveform. As a result, the harmonic contents are less. For example, by selecting the phase shift between the first PWM waveform and the second PWM waveform, a dominant harmonic such as the fifth harmonic may be eliminated. Another advantageous feature of having the multilevel waveform is that the multilevel waveform helps to simplify the design of the filtering circuit of the motor drive system.

In some embodiments, the power conversion system 100 is configured to operate in a motor drive mode. The DC voltage from the DC power source 110 is converted into an AC voltage for driving the motor 120. Alternatively, the power conversion system 100 is configured to operate in a battery charging mode. The AC power source 130 is employed to charge the battery in the DC power source 110.

In operation, during the battery charging mode, the AC power source 130 provides power for charging the DC power source 110. During the battery charging mode, the windings of the motor 120 and the switches of the second inverter 160 form a power factor correction device. The power factor correction device is configured such that the power factor of the power conversion system 100 is adjusted to a level approximately equal to unity through adjusting input currents flowing into the power factor correction device. It should be noted that various devices may achieve power factors within different ranges. For example, one range may be from 0.99 to 1. The range above is set for a given device may depend on various factors.

In operation, during the motor drive mode, in order to achieve high efficiency, the power from the DC power source 110 to the motor 120 is delivered through two routes, namely a first route comprising the first inverter 150 and a second route comprising the second inverter 160 and its associated isolated power converter. In some embodiments, the power flowing from the DC power source 110 to the motor 120 through the second inverter 160 is a fraction of the power from the DC power source 110 to the motor 120 through the first inverter 150. For example, only about 15% of the total power passes through the second inverter 160. The majority of the total power (85%) passes through the first inverter 150. According to the power distribution different between the two routes, the design of the first inverter 150 and the second inverter 160 may be adjusted accordingly. For example, the voltage rating of the switches of the second inverter 160 may be less than the voltage rating of the switches of the first inverter 150. The low voltage rating of the components (e.g., switches) of the second inverter 160 helps to reduce the cost and improve the efficiency of the second inverter 160. In other words, the uneven power distribution between the two different power delivery routes helps to improve the performance (e.g., efficiency and cost) of the power conversion system 100.

Another advantageous feature of having the power conversion system 100 shown in FIG. 1 is that the power conversion system 100 is able to provide a voltage boost through connecting the outputs of the first inverter 150 and the outputs of the second inverter 160 in series. The voltage boost helps to improve the performance of the motor 120 when the motor 120 runs at a high speed.

Another advantageous feature of having the power conversion system 100 shown in FIG. 1 is that the power conversion system 100 is able to deliver on-board fast charging through reusing the windings of the motor 120 as part of the power factor correction circuit. The power conversion system 100 can combine an on-board battery charger (OBC) and a motor control unit (MCU) into a single system.

Figure 2:
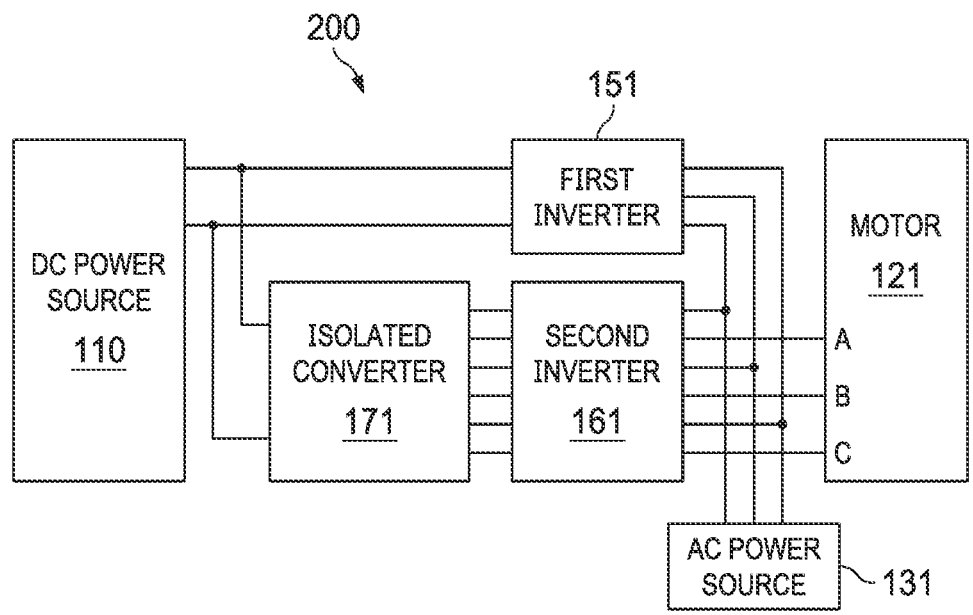
FIG. 2 illustrates a block diagram of a first implementation of the power conversion system shown in FIG. 1 in accordance with various embodiments of the present disclosure.

FIG. 2 illustrates a block diagram of a first implementation of the power conversion system shown in FIG. 1 in accordance with various embodiments of the present disclosure. The power conversion system 200 includes the DC power source 110, a motor 121, an AC power source 131, a first inverter 151, a second inverter 161 and an isolated converter 171.

As shown in FIG. 2, two inputs of the first inverter 151 are connected to two outputs of the DC power source 110. Two inputs of the isolated converter 171 are connected to the two outputs of the DC power source 110. The isolated converter 171 includes six output terminals, which are connected to six inputs of the second inverter 161. The isolated converter 171 provides electrical isolation between the inputs of the first inverter 151 and the inputs of the second inverter 161 so that the outputs of the first inverter 151 and the outputs of the second inverter 161 can be added together to generate a multilevel PWM waveform for driving the motor 121.

In some embodiments, the isolated converter 171 is implemented as a high frequency (HF) bridge LLC power converter. Alternatively, the isolated converter 171 is implemented as a full-bridge LLC power converter. The detailed implementation of the isolated converter 171 will be discussed below with respect to FIG. 3.

It should be noted that implementing the isolated converter 171 as an LLC power converter is merely an example, which should not unduly limit the scope of the claims. One of ordinary skill in the art would recognize many variations, alternatives, and modifications. For example, the isolated converter 171 can be implemented as any suitable isolated power converters such as flyback converters, forward converters, push-pull converters, half-bridge converters, full-bridge converters, any combinations thereof and the like.

As shown in FIG. 2, the first inverter 151 has three outputs. The second inverter 161 has six outputs. Three outputs of the second inverter 161 are connected to three outputs of the first inverter 151, respectively. The other three outputs of the second inverter 161 are connected to the three phases (A, B and C) of the motor 121, respectively. The AC power source 131 has three outputs, which are connected to the common nodes of the first inverter 151 and the second inverter 161, respectively. The detailed implementation of the power conversion system 200 will be discussed below with respect to FIG. 3.

In some embodiments, the DC power source 110 is implemented as a battery pack of an electric vehicle. The AC power source 131 is implemented as a three-phase AC power source from the grid. The motor 121 is a three-phase induction motor.

In operation, the power conversion system 200 may operate in a motor drive mode in which the power is transferred from the DC power source 110 to the motor 121 through the first inverter 151 and the second inverter 161. The outputs of the first inverter 151 and the outputs of the second inverter 161 are connected in series to generate multilevel waveforms for driving the motor 121. Alternatively, the power conversion system 200 may operate in a battery charging mode in which the power is transferred from the AC power source 131 to the DC power source 110 (battery pack) through the windings of the motor 121, the second inverter 161 and the isolated converter 171.

Figure 3A:
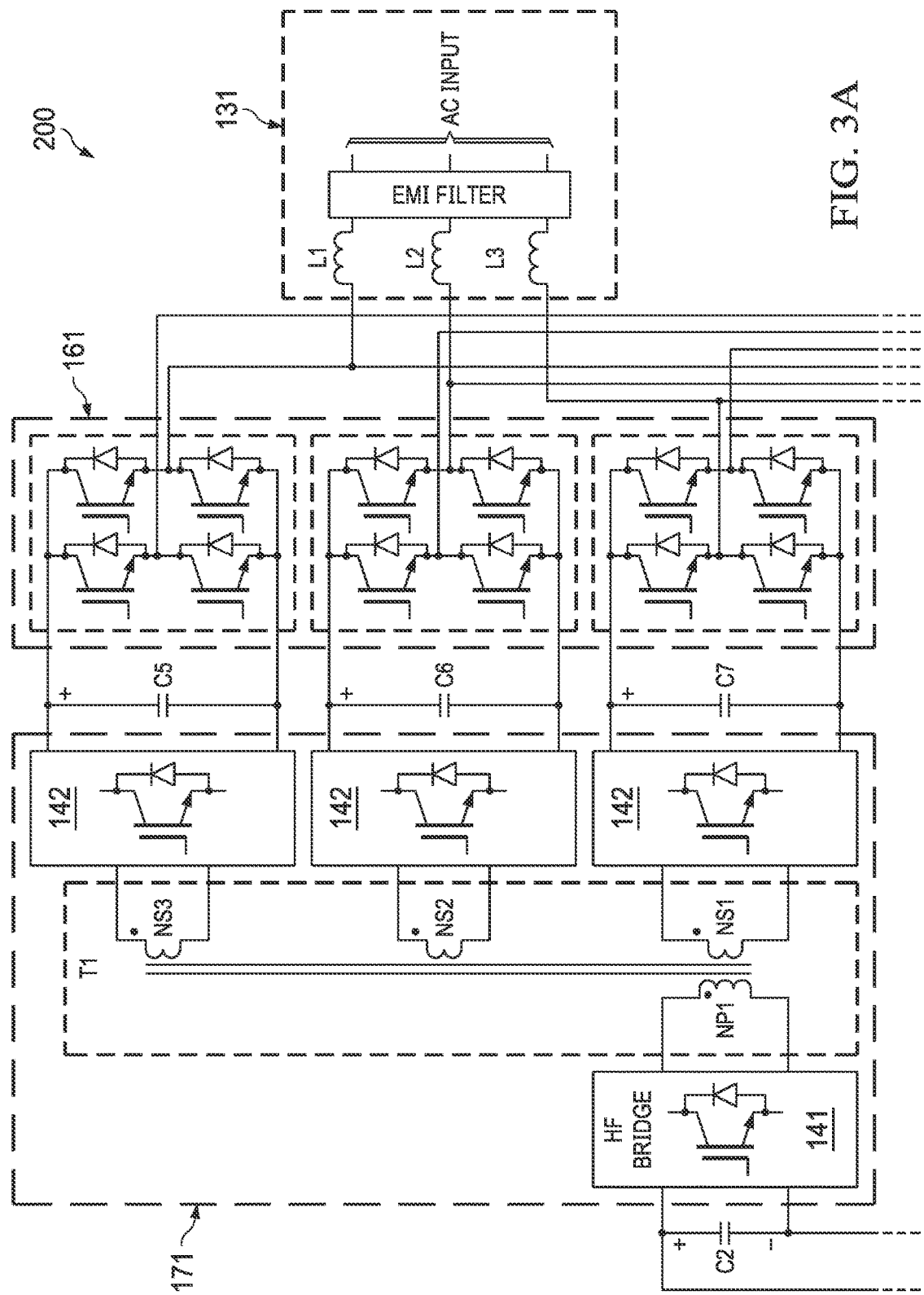
FIGS. 3A and 3B illustrate a schematic diagram of the power conversion system shown in FIG. 2 in accordance with various embodiments of the present disclosure.
Figure 3B:
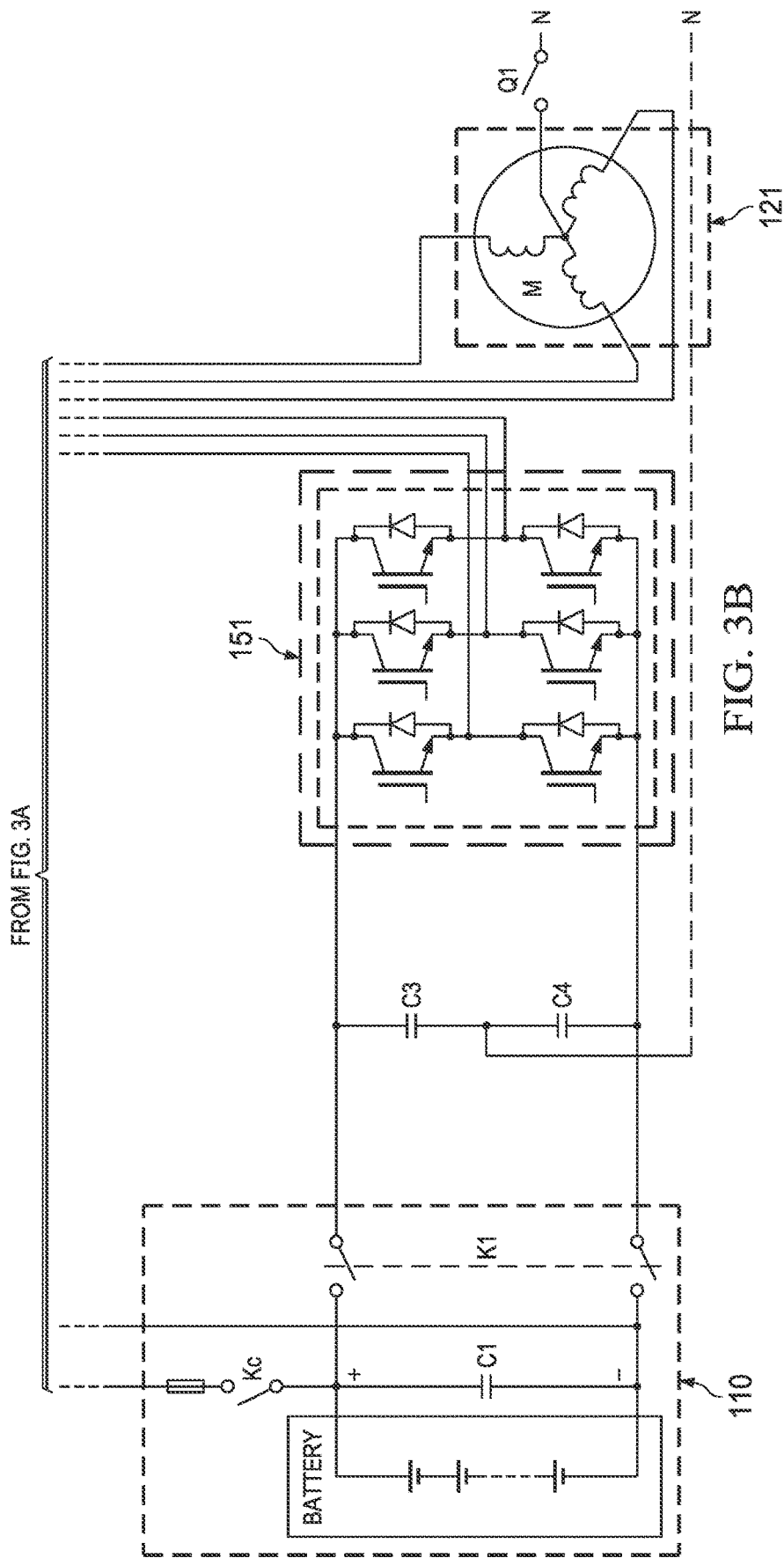

FIG. 3A and FIG. 3B illustrate a schematic diagram of the power conversion system shown in FIG. 2 in accordance with various embodiments of the present disclosure. Throughout the description, FIG. 3A and FIG. 3B are collectively referred to as FIG. 3. The power conversion system 200 includes the DC power source 110, the motor 121, the AC power source 131, the first inverter 151, the second inverter 161 and the isolated converter 171.

As shown in FIG. 3, the DC power source 110 comprises a plurality of batteries connected in series. The DC power source 110 further comprises an output capacitor C1, a first operation control switch K1 and a second operation control switch Kc. The output capacitor C1 is employed to reduce the ripple components and provide a steady DC voltage for the power conversion system 200.

The motor 121 includes three windings arranged in a Y-configuration as shown in FIG. 3. The common node of the three windings is connected to a neutral point N through a switch Q1. The AC power source 131 may be a three-phase AC power source. In some embodiments, the output voltage of the AC power source 131 is in a range from about 220 V to about 240 V. Alternatively, depending on different design needs, the AC power source 131 may be implemented as a two-phase power source or a single-phase power source.

The first operation control switch K1 and the second operation control switch Kc are employed to control the operation of the power conversion system 200. More particularly, during the motor drive mode, the first operation control switch K1 and the second operation control switch Kc remain closed. The outputs of the isolated converter 171 are connected in series with the output voltage of the battery, which adds up to boost the DC voltage for the power conversion system 200. During the battery charging mode, the first operation control switch K1 is open. The AC power goes through the second inverter 161 and the isolated converter 171 to charge the battery. More particularly, the isolated converter 171 operates in a reverse power flow mode and charges up the voltage of the battery of the DC power source 110.

The first inverter 151 is a full-bridge inverter comprising three legs. A midpoint of each leg is an output of the first inverter 151. As shown in FIG. 3, the first inverter 151 has three outputs. The detailed schematic diagram of the first inventor 151 will be discussed below with respect to FIG. 10.

The second inverter 161 comprises three inverting units, each of which is a full-bridge inverter having two legs. A midpoint of each leg is an output of the full-bridge inverter. As shown in FIG. 3, each inverting unit has two outputs. The detailed schematic diagram of the inverting unit will be discussed below with respect to FIG. 11.

The isolated converter 171 may be implemented as an LLC resonant converter. The isolated converter 171 comprises a primary switching network 141, a primary winding NP1, a first secondary winding NS1, a second secondary winding NS2, a third secondary winding NS3 and three rectifiers 142. As shown in FIG. 3, the primary winding NP1 is connected to the battery through the primary switching network 141. The first secondary winding NS1 is connected to the first inverting unit through the first rectifier. The second secondary winding NS2 is connected to the second inverting unit through the second rectifier. The third secondary winding NS3 is connected to the third inverting unit through the third rectifier.

The transformer T1 provides electrical isolation between the primary side (side having primary switching network 141) and the secondary side (side having rectifiers 141) of the isolated converter 171. In accordance with an embodiment, the transformer T1 may be formed of a primary transformer winding (e.g., winding NP1) and three secondary transformer windings (e.g., windings NS1-NS3) as shown in FIG. 3. It should be noted that the transformer illustrated herein and throughout the description are merely examples, which should not unduly limit the scope of the claims. One of ordinary skill in the art would recognize many variations, alternatives, and modifications. For example, the transformer T1 may further comprise a variety of bias windings and gate drive auxiliary windings.

The rectifier (e.g., the first rectifier) converts an alternating polarity waveform received from the secondary winding (e.g., winding NS1) of the transformer T1 to a single polarity waveform. The detailed operation and structure of the isolated converter 171 will be discussed below with respect to FIGS. 4-9.

The power conversion system 200 further comprises input capacitors C2, C3, C4, and output capacitors C5, C6 and C7. The input capacitors C2, C3 and C4 are employed to reduce the ripple components and provide steady input DC voltages for the primary switching network 141 and the first inverter 151, respectively. Furthermore, a common node of the input capacitors C3 and C4 may be connected to the neutral point of the power conversion system as indicated by the dashed line shown in FIG. 3. The output capacitors C5, C6 and C7 are employed to reduce the ripple components and provide steady input DC voltages for the second inverter 161.

In some embodiments, the isolated converter 171 and the second inverter 161 form a bidirectional power conversion system. In operation, when the power conversion system 200 is configured to convert DC power into AC power to drive the motor 121, the isolated converter 171 is configured as an isolated DC/DC converter for converting the output voltage of the battery into three suitable DC voltages applied to the three inverting units respectively. On the other hand, when the power conversion system 200 is configured to convert AC power into DC power to charge the battery, the windings of the motor 121 and the switches of the second inverter 161 form a power factor correction device. In some embodiments, the power factor correction device is configured such that the power factor of the power conversions system 200 is adjusted to a level approximately equal to unity through adjusting the input current flowing into the power factor correction device. The power factor correction device may be implemented as any suitable power factor correction converters such as boost power factor correction rectifiers and the like. When the power conversion system 200 is configured to convert AC power into DC power to charge the battery, the isolated converter 171 operates in a reverse power flow mode to charge the voltage of the battery.

As shown in FIG. 3, the AC power source 131 further comprises an EMI filter and three inductors L1-L3. The EMI filter may comprise a plurality of capacitors. The inductors L1-L3 allow DC or low frequency currents to pass through, while blocking the unwanted high frequency currents. The capacitors of the EMI filter provide low impedance paths to divert the unwanted high frequency currents or noise from the EMI filter. The unwanted high frequency currents either go back into the input power source or into ground. As a result of employing the EMI filters, the power conversion system 200 may meet various EMI regulations.

The switches shown in FIG. 3 may be implemented as insulated gate bipolar transistor (IGBT) devices. Alternatively, the switches may be formed by other types of controllable devices such as metal oxide semiconductor field effect transistor (MOSFET) devices, bipolar junction transistor (BJT) devices, super junction transistor (SJT) devices and the like.

Figure 4:
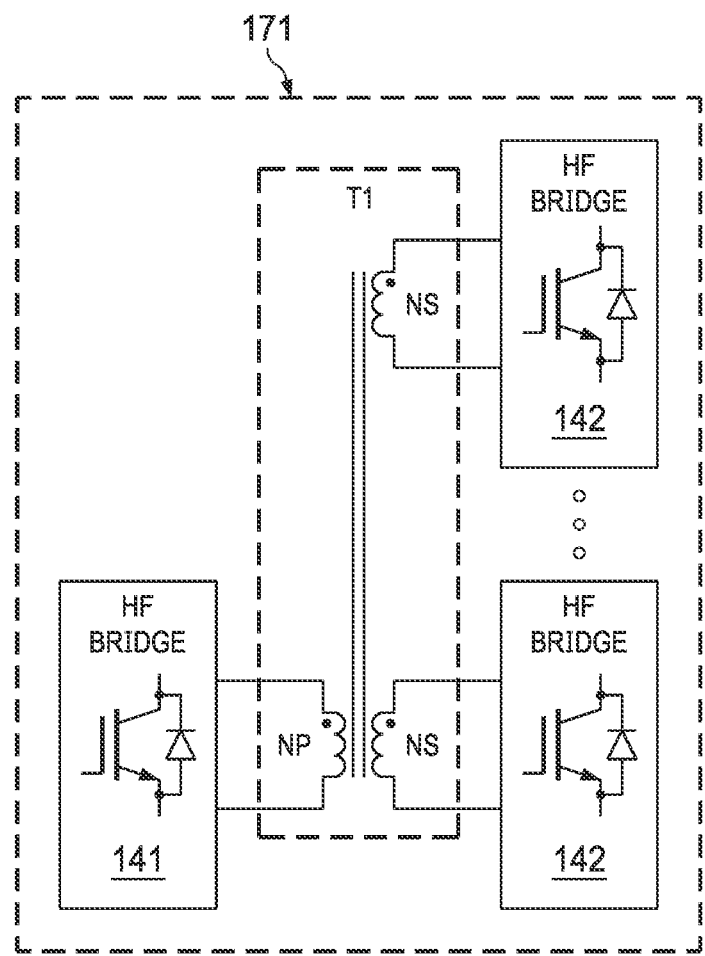
FIG. 4 illustrates a block diagram of a first implementation of the isolated converter shown in FIG. 3 in accordance with various embodiments of the present disclosure.

FIG. 4 illustrates a block diagram of a first implementation of the isolated converter shown in FIG. 3 in accordance with various embodiments of the present disclosure. The isolated converter 171 comprises a primary HF bridge 141, a primary winding NP, a plurality of second windings NS and a plurality of secondary HF bridges 142. As shown in FIG. 4, the primary winding NP and the plurality of secondary windings NS are magnetically coupled to each other to form the transformer T1. Depending on different design needs and applications, the number of the secondary windings and the associated secondary HF bridges may be selected accordingly. Referring back to FIG. 3, in order to provide isolated power for the three inverting units of the second inverter 161, three secondary windings and three secondary HF bridges have been employed. The detailed structure of the primary HF bridge 141 and the secondary HF bridges 142 will be described below with respect to FIGS. 5-6. For simplicity, only one secondary HF bridge is included in FIGS. 5-6.

Figure 5:
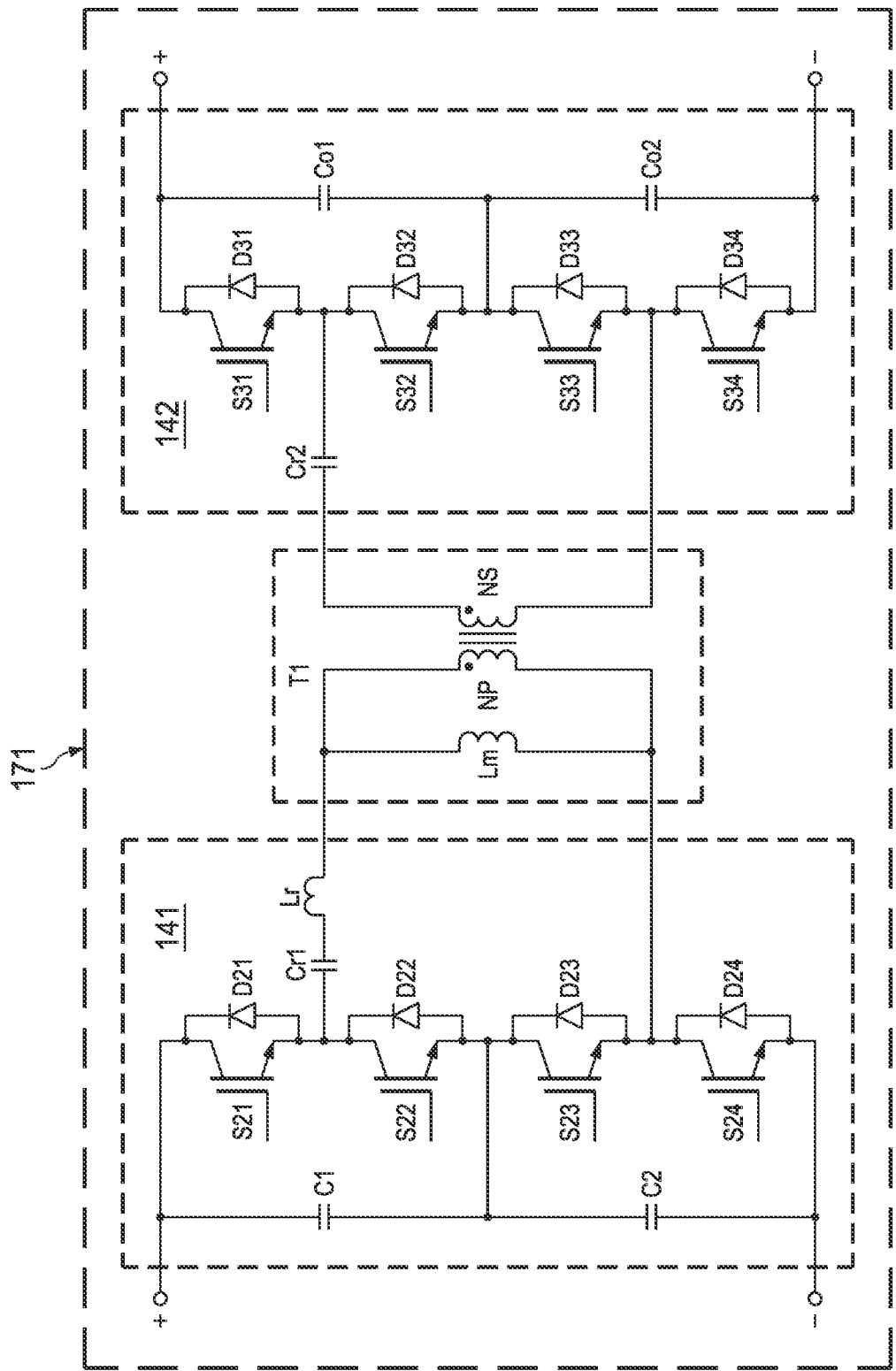
FIG. 5 illustrates a schematic diagram of a first implementation of the isolated converter shown in FIG. 4 in accordance with various embodiments of the present disclosure.

FIG. 5 illustrates a schematic diagram of a first implementation of the isolated converter shown in FIG. 4 in accordance with various embodiments of the present disclosure. The isolated converter 171 is implemented as a three-level LLC power converter. Throughout the description, the isolated converter 171 may be alternatively referred to as a three-level LLC power converter. The primary HF bridge 141 is alternatively referred to as a primary network. The secondary HF bridge 142 is alternatively referred to as a secondary network.

In some embodiments, the input of the three-level LLC power converter 171 is connected to the battery shown in FIG. 3. In some embodiments, the input voltage of the three-level LLC power converter 171 is a first DC voltage in a range from about 240 V to about 490 V. The output of the three-level LLC power converter 171 is a second DC voltage in a range from about 50 V to about 200 V.

As shown in FIG. 5, the three-level LLC power converter 171 comprises the primary network 141, the transformer T1 and the secondary network 142. The primary network 141 comprises input capacitors C1, C2, a switch network and a resonant tank. The transformer T1 comprises a primary winding NP and a secondary winding NS. The secondary network 142 comprises a secondary resonant capacitor Cr2, a rectifier and output capacitors Co1, Co2. As shown in FIG. 5, the switch network, the resonant tank, the transformer T1 and the rectifier are coupled to each other and connected in cascade.

The switch network comprises switches S21, S22, S23 and S24 connected in series between the positive terminal of the input capacitor C1 and the negative terminal of the input capacitor C2. The common node of switches S22 and S23 is connected to the common node of the capacitors C1 and C2. The common node of switches S21 and S22 is connected to a first terminal of the transformer T1 through the resonant tank. The common node of switches S23 and S24 is connected to a second terminal of the transformer T1.

The resonant tank may be implemented in a variety of ways. For example, the resonant tank comprises a series resonant inductor Lr, a parallel resonant inductor Lm and a series resonant capacitor Cr1.

The series resonant inductor and the parallel resonant inductor may be implemented as external inductors. A person skilled in the art will recognize that there may be many variation, alternatives and modifications. For example, the series resonant inductor may be implemented as a leakage inductance of the transformer T1.

In sum, the resonant tank includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank, the resonant tank helps to achieve zero voltage switching for the primary side switching elements and zero current switching for the secondary side switching elements.

The transformer T1 may be formed of two transformer windings, namely a primary transformer winding NP and a secondary transformer winding NS as shown in FIG. 5. Alternatively, the transformer T1 may have a center tapped secondary so as to have three transformer windings including a primary transformer winding, a first secondary transformer winding and a second secondary transformer winding.

The secondary network 142 converts an alternating polarity waveform received from the secondary winding NS of the transformer T1 to a single polarity waveform, which is applied to the inputs of the inverting unit (shown in FIG. 3). Two output capacitors Co1 and Co2 are connected in series between a first output and a second output of the isolated converter 171. The output capacitors Co1 and Co2 are employed to reduce the ripple components and provide a steady DC voltage for the inverting unit.

The secondary network 142 comprises a secondary resonant capacitor Cr2, switches S31, S32, S33 and S34, and diodes D31, D32, D33 and D34. As shown in FIG. 5, switches S31, S32, S33 and S34 are connected in series between the first output and a second output of the isolated converter 171. The common node of switches S32 and S33 is connected to the common node of the capacitors Co1 and Co2. The common node of switches S31 and S32 is connected to a first terminal of the secondary winding NS through the secondary resonant capacitor Cr2. The common node of switches S33 and S34 is connected to a second terminal of the secondary winding NS directly.

It should be noted that the schematic diagram of the secondary network 142 is merely an example, which should not unduly limit the scope of the claims. One of ordinary skill in the art would recognize many variations, alternatives, and modifications. For example, the secondary network 142 may include a secondary resonant tank (a resonant inductor and a resonant capacitor). In particular, when the isolated power converter 171 operates in a reverse power flow mode, the secondary resonant tank is necessary for improving the efficiency of the isolated power converter 171.

In accordance with an embodiment, the switches (e.g., switches S21-S24 and S31-S34) may be an insulated gate bipolar transistor (IGBT) device. Alternatively, the switching element shown in FIG. 5 can be any controllable switches such as metal oxide semiconductor field effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and/or the like. Throughout the description, the switch symbols (e.g., the symbol of IGBTs) are merely examples. Depending on different applications and design needs, the switches shown in this disclosure can be any controllable switches.

It should be noted that when switches S21-S24 and S31-S34 are implemented by MOSFET devices, the body diodes of switches S21-S24 and S31-S34 can be used to provide a freewheeling channel. On the other hand, when switches S21-S24 and S31-S34 are implemented by IGBT devices, a separate freewheeling diode is required to be connected in parallel with its corresponding switch.

As shown in FIG. 5, diodes D21-D24 and D31-D34 are required to provide reverse conducting paths. In other words, diodes D21-D24 and D31-D34 are anti-parallel diodes. In some embodiments, diodes D21-D24 and D31-D34 are co-packaged with their respective IGBT devices S21-S24 and S31-S34. In alternative embodiments, didoes D21-D24 and D31-D34 are placed outside their respective IGBT devices S21-S24 and S31-S34.

It should further be noted that while FIG. 5 shows each bidirectional switch is formed by diodes and IGBT devices connected in an anti-parallel arrangement, one of ordinary skill in the art would recognize many variations, alternatives and modifications. For example, the bidirectional switch may be implemented by some new semiconductor switches such as anti-paralleled reverse blocking IGBTs arrangement. The discussion of the IGBT devices herein is applicable to other IGBT devices of this disclosure.

One advantageous feature of having the three-level LLC power converter 171 shown in FIG. 5 is the power conversion system is able to achieve high efficiency under various operating conditions. For example, the battery voltage and the output voltage of the power conversion system 200 may vary in a wide range. Such a wide range may cause an efficiency drop. The three-level LLC power converter 171 shown in FIG. 5 uses three-level switching bridges for both the primary side and the secondary side. The three-level switching bridges are suitable for the applications having a wide voltage variation range. As a result of having the three-level LLC power converter 171, the power conversion system 200 can operate at a switching frequency substantially equal to the resonant frequency of the LLC power converter 171, thereby improving the efficiency of the three-level LLC power converter 171.

Figure 6:
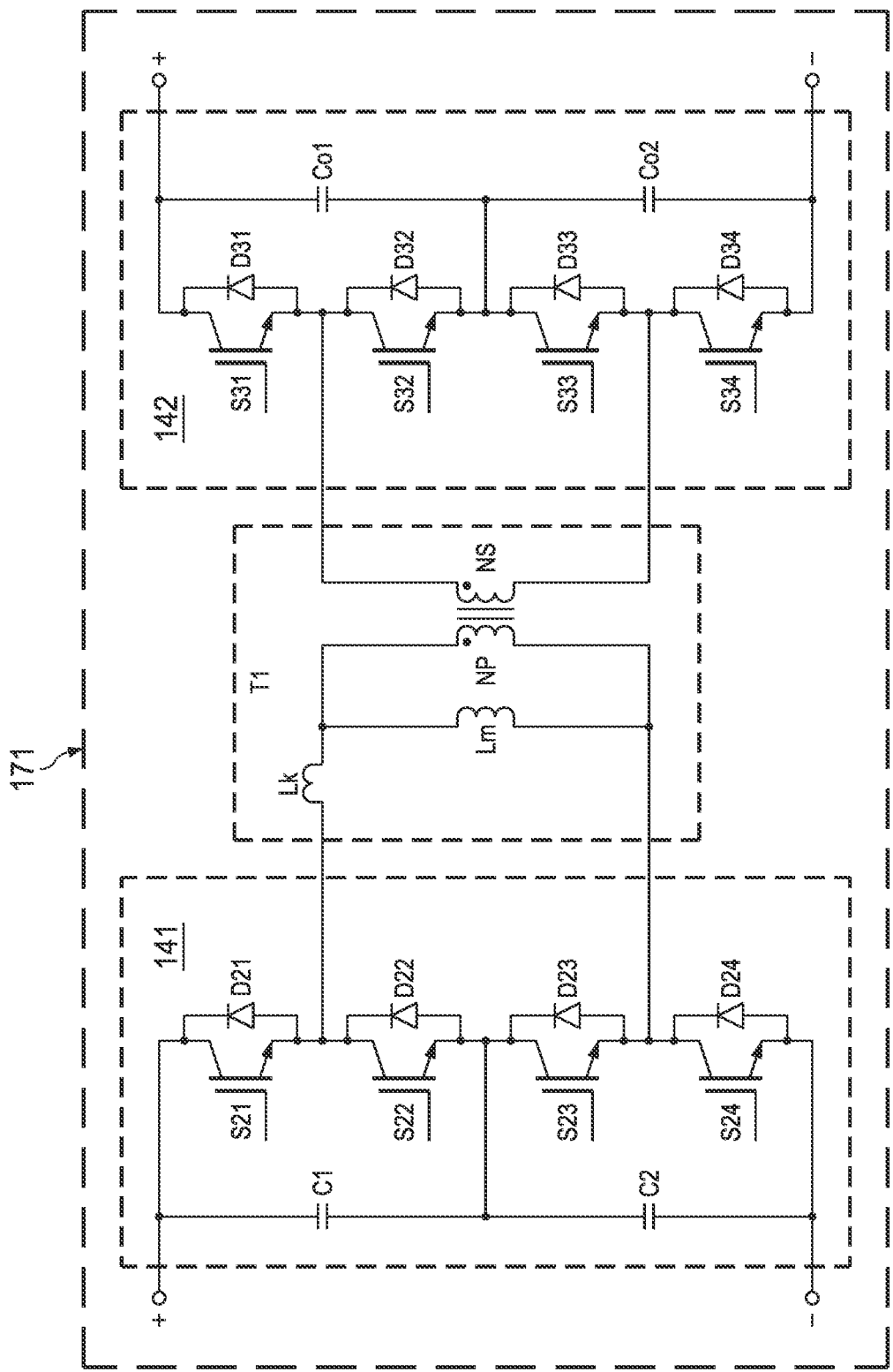
FIG. 6 illustrates a schematic diagram of a second implementation of the isolated converter shown in FIG. 4 in accordance with various embodiments of the present disclosure.

FIG. 6 illustrates a schematic diagram of a second implementation of the isolated converter shown in FIG. 4 in accordance with various embodiments of the present disclosure. The isolated converter 171 shown in FIG. 6 is similar to that shown in FIG. 5 except that the isolated converter 171 is implemented as a three-level dual-active-bridge (DAB) converter. The structure of the three-level DAB converter shown in FIG. 6 is similar to that shown in FIG. 5 except that the resonant capacitors are not included. The three-level DAB converter shown in FIG. 6 is well known, and hence is not discussed in detail herein.

Figure 7:
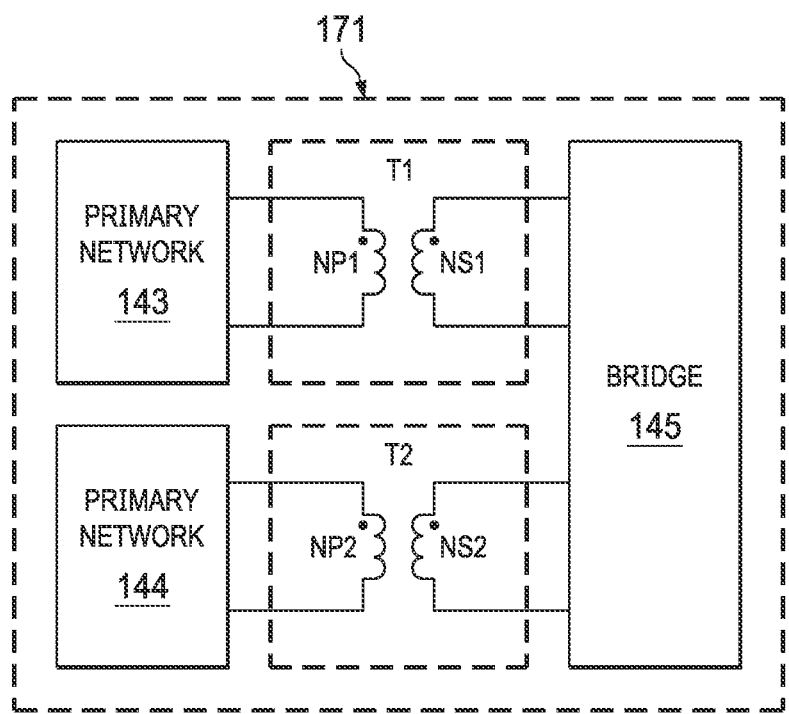
FIG. 7 illustrates a block diagram of a second implementation of the isolated converter shown in FIG. 3 in accordance with various embodiments of the present disclosure.

FIG. 7 illustrates a block diagram of a second implementation of the isolated converter shown in FIG. 3 in accordance with various embodiments of the present disclosure. The isolated converter 171 is implemented as a power converter having an interleaved multi-bridge circuit. The isolated converter 171 comprises a first primary network 143, a first transformer T1, a second primary network 144, a second transformer T2 and an interleaved multi-bridge circuit 145.

The first primary network 143 is connected to a primary winding NP1 of the first transformer T1. The second primary network 144 is connected to a primary winding NP2 of the second transformer T2. The interleaved multi-bridge circuit 145 is connected to a secondary winding NS1 of the first transformer T1 and a secondary winding NS2 of the second transformer T2. The detailed schematic diagram of the isolated converter 171 will be described below with respect to FIGS. 8-9.

Figure 8:
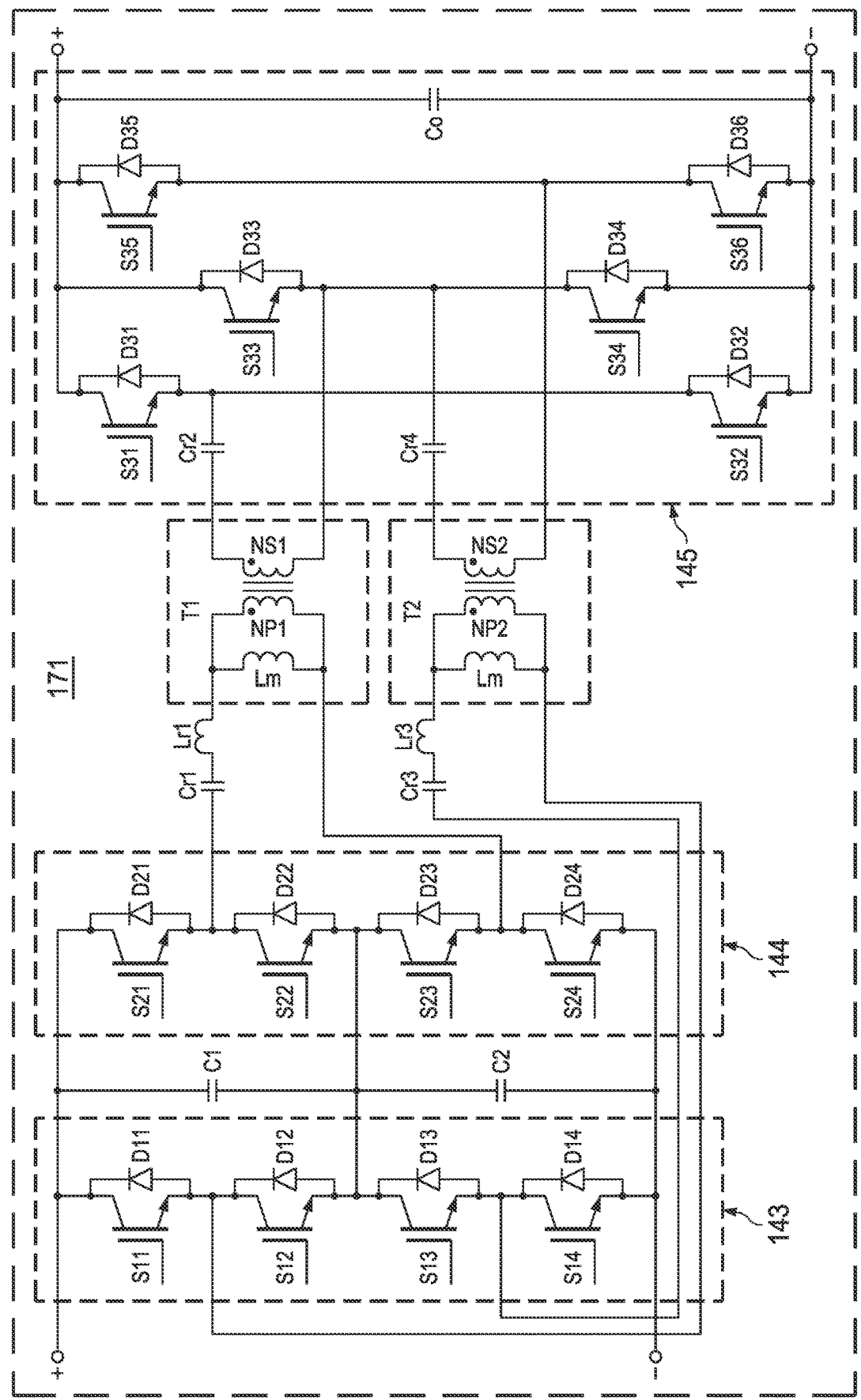
FIG. 8 illustrates a schematic diagram of a first implementation of the isolated converter shown in FIG. 7 in accordance with various embodiments of the present disclosure.

FIG. 8 illustrates a schematic diagram of a first implementation of the isolated converter shown in FIG. 7 in accordance with various embodiments of the present disclosure. The isolated converter 171 includes two transformers T1 and T2 as shown in FIG. 8. The primary side of the transformer T1 is connected to the first primary network 143 comprising switches S21-S24, diodes D21-D24. The first primary network 143 further comprises a first resonant tank comprising a resonant inductor Lrl and a resonant capacitor Cr1. The first primary network 143 is the primary side of a three-level LLC power converter. Likewise, the primary side of the transformer T2 is connected to the second primary network 144 comprising switches S11-S14, diodes D11-D14. The second primary network 144 further comprises a second resonant tank comprising a resonant inductor Lr3 and a resonant capacitor Cr3. The second primary network 144 is the primary side of a three-level LLC power converter. The primary side of the three-level LLC power converter has been described above with respect to FIG. 5, and hence is not discussed herein.

The secondary side of transformer T1 and the secondary side of transformer T2 are connected to the interleaved multi-bridge circuit 145. As shown in FIG. 8, the inputs of the interleaved multi-bridge circuit 145 are connected to the secondary windings NS1 and NS2 respectively. The outputs of the interleaved multi-bridge circuit 145 are connected to an output capacitor Co.

As shown in FIG. 8, the interleaved multi-bridge circuit 145 comprises three legs. A first leg comprises a first switch S31 and a second switch S32 connected in series. A second leg comprises a third switch S33 and a fourth switch S34 connected in series. A third leg comprises a fifth switch S35 and a sixth switch S36 connected in series. The secondary winding NS1 of the first transformer T1 is connected between a common node of the first switch S31 and the second switch S32, and a common node of the third switch S33 and the fourth switch S34 through a resonant capacitor Cr2. The secondary winding NS2 of the second transformer T2 is connected between a common node of the fifth switch S35 and the sixth switch S36, and the common node of the third switch S33 and the fourth switch S34 through a resonant capacitor Cr4.

In operation, depending on the phase shift between the two primary networks 143 and 144, the secondary winding NS1 and the second winding NS2 are connected either in parallel or in series. When the phase shift between the switches of the primary network 143 and the switches of the primary network 144 is equal to zero degrees, the secondary winding NS1 and the secondary winding NS2 are connected in series. In a first half of a cycle, the switches S31 and S36 conduct. In a second half of the cycle, the switches S32 and S35 conduct. On the other hand, when the phase shift between the switches of the primary network 143 and the switches of the primary network 144 is equal to 180 degrees, the secondary winding NS1 and the secondary winding NS2 are connected in parallel. In a first half of a cycle, the switches S31 and S34 conduct to deliver the power from the secondary winding NS1 to the load. The switches S35 and S34 conduct to deliver the power from the secondary winding NS2 to the load. In a second half of the cycle, the switches S32 and S33 conduct to deliver the power from the secondary winding NS1 to the load. The switches S33 and S36 conduct to deliver the power from the secondary winding NS2 to the load.

One advantageous feature of having the phase shift between the two primary networks 143 and 144 is that the isolated converter 171 is able to operate under a wide battery input voltage as well as a wide output voltage.

Figure 9:
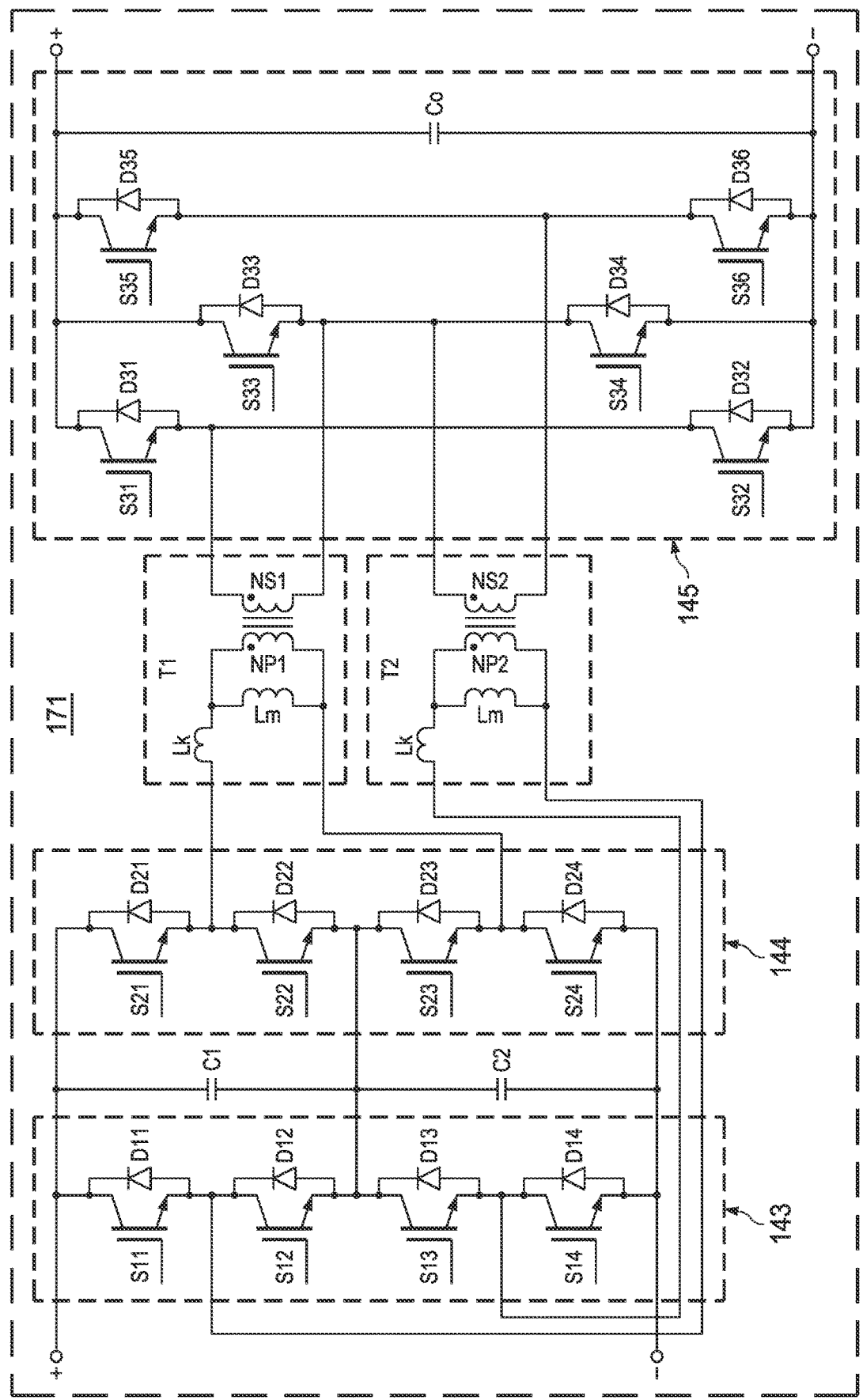
FIG. 9 illustrates a schematic diagram of a second implementation of the isolated converter shown in FIG. 7 in accordance with various embodiments of the present disclosure.

FIG. 9 illustrates a schematic diagram of a second implementation of the isolated converter shown in FIG. 7 in accordance with various embodiments of the present disclosure. The isolated converter shown in FIG. 9 is similar to that shown in FIG. 8 except that the three-level LLC converter 171 has been replaced by a three-level DAB converter. The three-level DAB converter is well known, and hence is not discussed herein.

Figure 10:
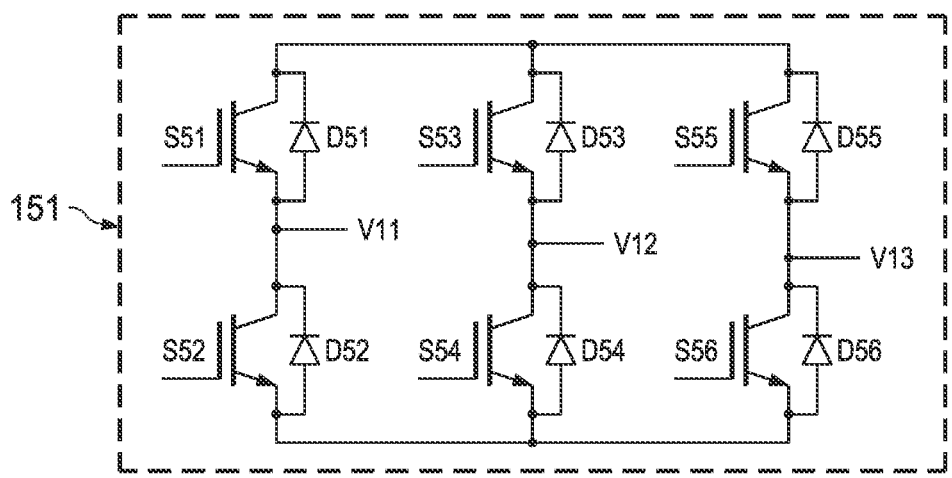
FIG. 10 illustrates a schematic diagram of the first inverter shown in FIG. 3 in accordance with various embodiments of the present disclosure.

FIG. 10 illustrates a schematic diagram of the first inverter shown in FIG. 3 in accordance with various embodiments of the present disclosure. The first inverter 151 is a three-phase inverter configured to convert a DC voltage into three AC waveforms. The first inverter 151 comprises six switches. The six switches form three legs. A first leg comprises switches S51 and S52 connected in series across a positive terminal and a negative terminal of an input of the first inverter 151. The common node of switches S51 and S52 is connected to a first output terminal V11 of the first inverter 151.

A second leg comprises switches S53 and S54 connected in series across the positive terminal and the negative terminal of the input of the first inverter 151. The common node of switches S53 and S54 is connected to a second output terminal V12 of the first inverter 151. A third leg comprises switches S55 and S56 connected in series across the positive terminal and the negative terminal of the input of the first inverter 151. The common node of switches S55 and S56 is connected to a third output terminal V13 of the first inverter 151. The operating principle of the three-phase inverter shown in FIG. 10 is well known, and hence is not discussed herein to avoid repetition.

As shown in FIG. 10, diodes D51-D56 are required to provide reverse conducting paths. In other words, diodes D51-D56 are anti-parallel diodes. In some embodiments, diodes D51-D56 are co-packaged with their respective IGBT devices S51-S56. In alternative embodiments, didoes D51-D56 are placed outside their respective IGBT devices S51-S56.

Figure 11:
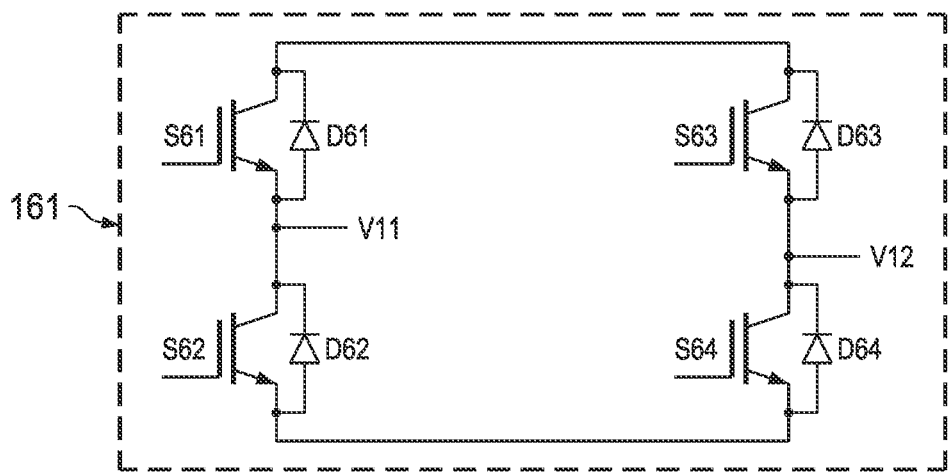
FIG. 11 illustrates a schematic diagram of an inverting unit shown in FIG. 3 in accordance with various embodiments of the present disclosure.

FIG. 11 illustrates a schematic diagram of an inverting unit shown in FIG. 3 in accordance with various embodiments of the present disclosure. The three inverting units shown in FIG. 3 form a three-phase inverter. Each inverting unit is a single-phase inverter. The inverting units shown in FIG. 3 share the same structure. For simplicity, only one inverting unit is illustrated in FIG. 11.

The inverting unit 161 is a single-phase inverter configured to convert a DC voltage into an AC waveform. The inverting unit 161 comprises four switches. The four switches form two legs. A first leg comprises switches S61 and S62 connected in series across a positive terminal and a negative terminal of an input of the inverting unit 161. The common node of switches S61 and S62 is connected to a first output terminal V11 of the inverting unit 161.

A second leg comprises switches S63 and S64 connected in series across the positive terminal and the negative terminal of the input of the inverting unit 161. The common node of switches S63 and S64 is connected to a second output terminal V12 of the inverting unit 161. The operating principle of the single-phase inverter shown in FIG. 11 is well known, and hence is not discussed herein.

As shown in FIG. 11, diodes D61-D64 are required to provide reverse conducting paths. In other words, diodes D61-D64 are anti-parallel diodes. In some embodiments, diodes D61-D64 are co-packaged with their respective IGBT devices S61-S64. In alternative embodiments, didoes D61-D64 are placed outside their respective IGBT devices S61-S64.

Figure 12:
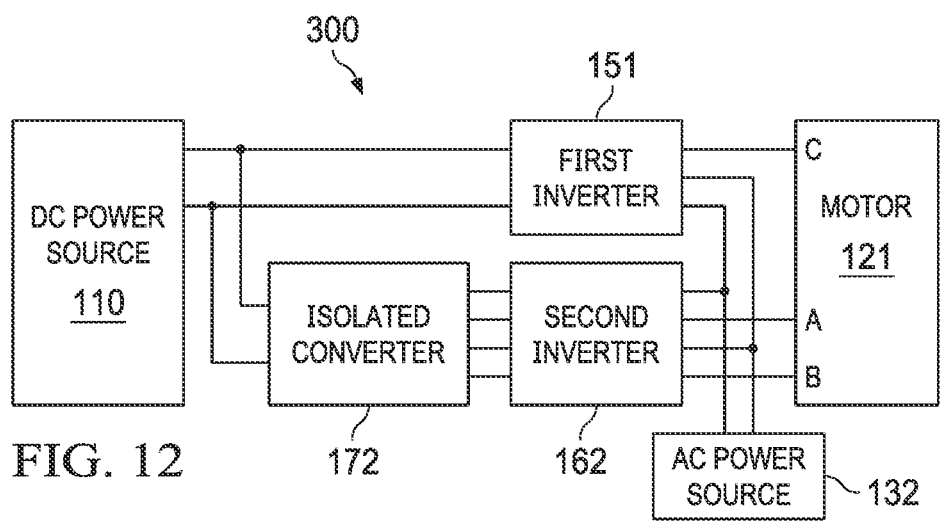
FIG. 12 illustrates a block diagram of a second implementation of the power conversion system shown in FIG. 1 in accordance with various embodiments of the present disclosure.

FIG. 12 illustrates a block diagram of a second implementation of the power conversion system shown in FIG. 1 in accordance with various embodiments of the present disclosure. The power conversion system 300 shown in FIG. 12 is similar to the power conversion system 200 shown in FIG. 2 except that the second inverter 162 comprises two inverting units and the isolated converter 172 comprises two secondary circuits. Furthermore, the AC power source 132 is either a single-phase power source or a two-phase power source.

Figure 13:
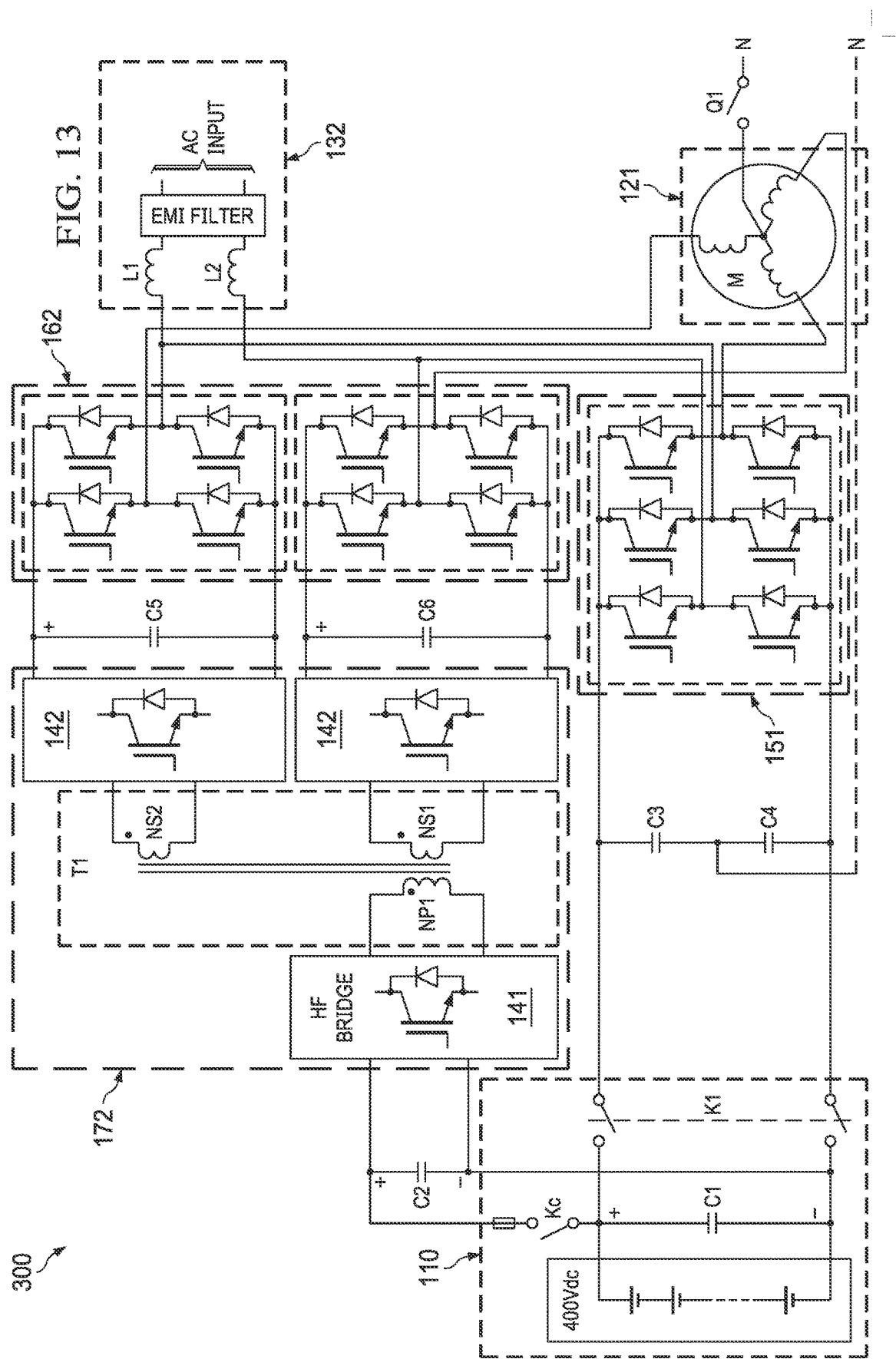
FIG. 13 illustrates a schematic diagram of the power conversion system shown in FIG. 12 in accordance with various embodiments of the present disclosure.

FIG. 13 illustrates a schematic diagram of the power conversion system shown in FIG. 12 in accordance with various embodiments of the present disclosure. The power conversion system 300 is similar to the power conversion system 200 shown in FIG. 2. As such, the identical portions of these two systems are not discussed again to avoid repetition.

The isolated converter 172 comprises two secondary windings, namely NS1 and NS2. Two rectifiers 142 are connected to the two secondary windings, respectively. The two rectifiers 142 generate two DC voltages fed to capacitors C5 and C6, respectively.

The second inverter 162 includes two inverting units as shown in FIG. 13. A first output of the first inverter 151 is connected to a first output of the first inverting unit. A second output of the first inverting unit is connected to a first phase of the motor 121. A second output of the first inverter 151 is connected to a first output of the second inverting unit. A second output of the second inverting unit is connected to a second phase of the motor 121. A third output of the first inverter 151 is connected to a third phase of the motor 121 directly.

The AC power source 132 is either a single-phase power source or a two-phase power source. As shown in FIG. 13, the AC power source 132 is connected to the second inverter 162 through an EMI filter and two inductors L1 and L2. The operating principle of the power conversion system 300 is similar to that of the power conversion system 200 described above, and hence is not discussed again herein.

Figure 14:
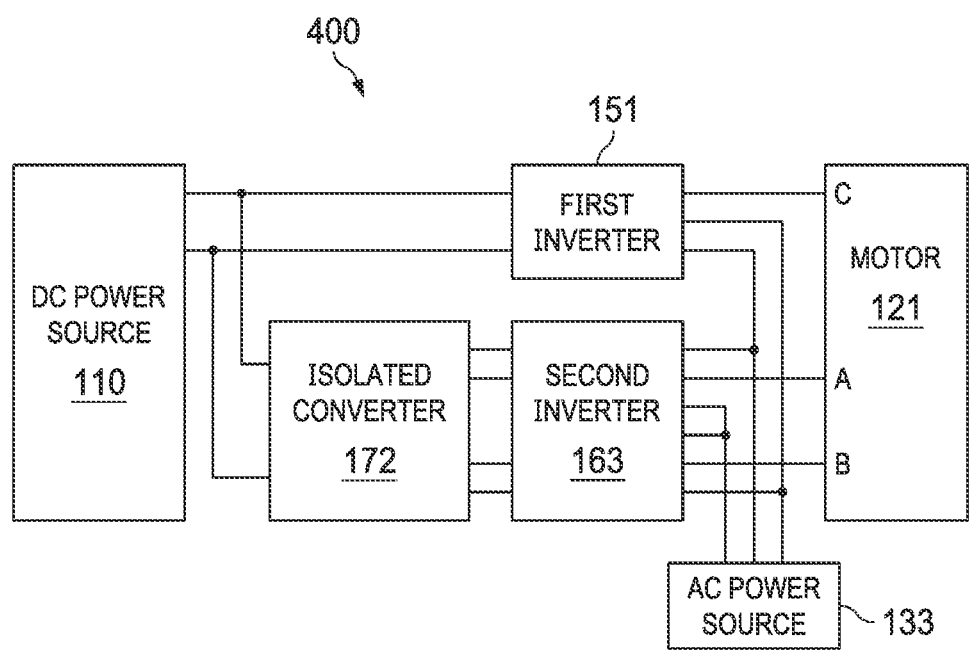
FIG. 14 illustrates a block diagram of a third implementation of the power conversion system shown in FIG. 1 in accordance with various embodiments of the present disclosure.

FIG. 14 illustrates a block diagram of a third implementation of the power conversion system shown in FIG. 1 in accordance with various embodiments of the present disclosure. The power conversion system 400 shown in FIG. 14 is similar to the power conversion system 300 shown in FIG. 12 except that the inverting units of the second inverter 163 shown in FIG. 14 are implemented as three-phase inverters. Furthermore, the AC power source 133 is can be a single-phase power source, a two-phase power source or a three-phase power source.

Figure 15:
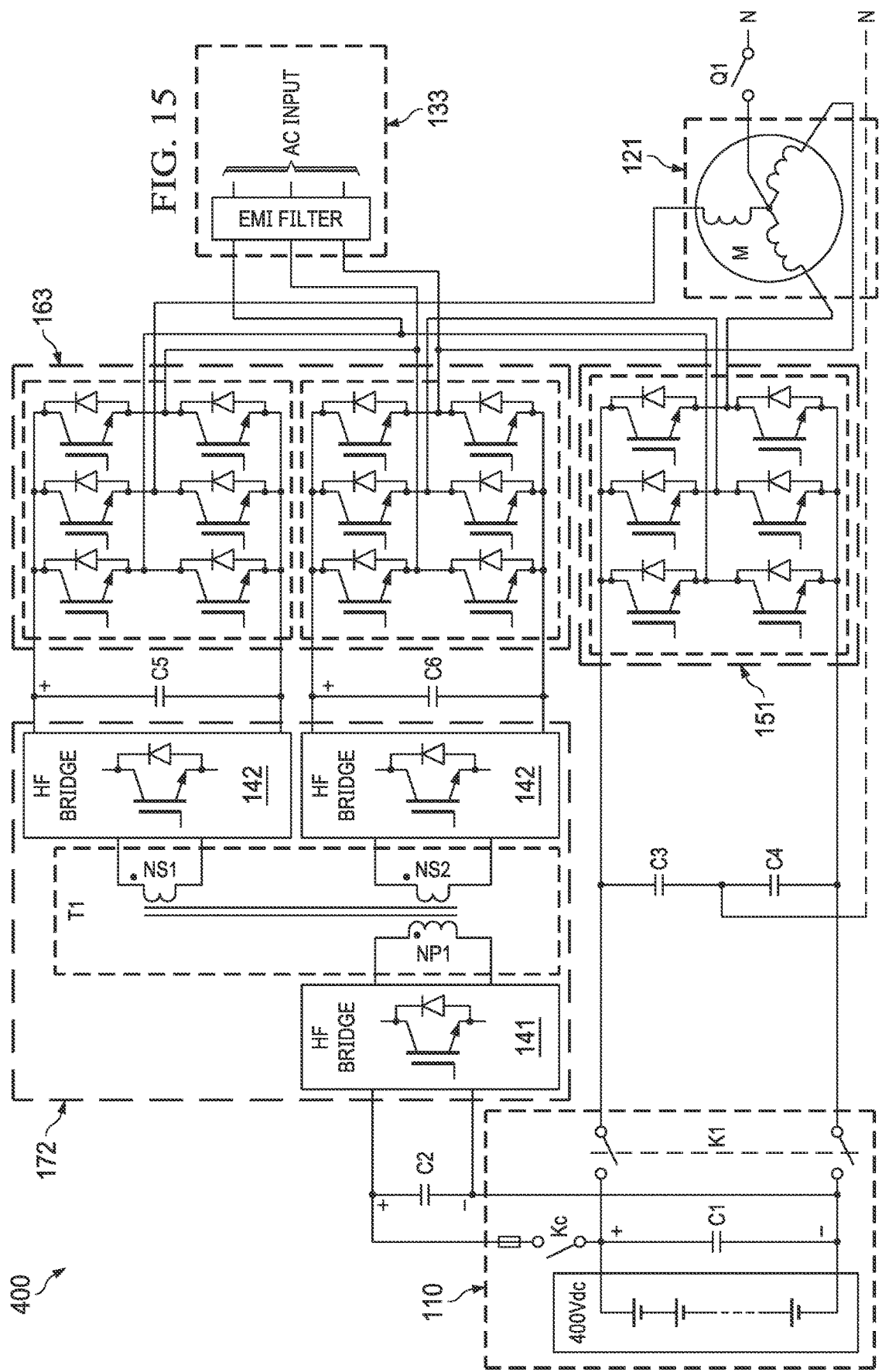
FIG. 15 illustrates a schematic diagram of the power conversion system shown in FIG. 14 in accordance with various embodiments of the present disclosure.

FIG. 15 illustrates a schematic diagram of the power conversion system shown in FIG. 14 in accordance with various embodiments of the present disclosure. The power conversion system 400 is similar to the power conversion system 300 shown in FIG. 13. As such, the identical portions of these two systems are not discussed again to avoid repetition.

The second inverter 163 includes two inverting units as shown in FIG. 15. Each inverting unit of the second inverter 163 is implemented as a three-phase inverter having three outputs, which is similar to the first inverter 151.

A first output of the first inverter 151 is connected to a first output of the first inverting unit and a first phase of the AC power source 133. A second output of the first inverting unit is connected to a first phase of the motor 121. A third output of the first inverting unit is connected to a third output of the second inverting unit and a second phase of the AC power source 133.

A second output of the first inverter 151 is connected to a first output of the second inverting unit and a third phase of the AC power source 133. A second output of the second inverting unit is connected to a third phase of the motor 121. A third output of the first inverter 151 is connected to a third phase of the motor 121 directly.

The AC power source 133 is a three-phase power source. Alternatively, the AC power source 133 may be a single-phase power source or a two-phase power source. In some embodiments, the output voltage of the AC power source 131 is in a range from about 220 V to about 240 V. As shown in FIG. 15, the AC power source 133 is connected to the second inverter 162 through an EMI filter.

Figure 16:
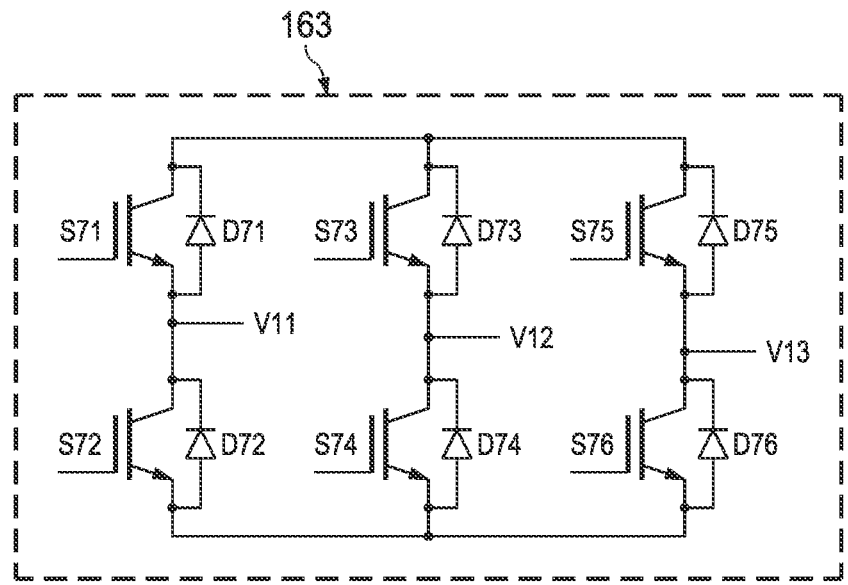
FIG. 16 illustrates a schematic diagram of the inverting unit shown in FIG. 15 in accordance with various embodiments of the present disclosure.

FIG. 16 illustrates a schematic diagram of the inverting unit shown in FIG. 15 in accordance with various embodiments of the present disclosure. The inverting unit 163 is a three-phase inverter configured to convert a DC voltage into three AC waveforms. The inverting unit 163 comprises six switches. The six switches form three legs. A first leg comprises switches S71 and S72 connected in series across a positive terminal and a negative terminal of an input of the inverting unit 163. The common node of switches S71 and S72 is connected to a first output terminal V11 of the inverting unit 163. A second leg comprises switches S73 and S74 connected in series across the positive terminal and the negative terminal of the input of the inverting unit 163. The common node of switches S73 and S74 is connected to a second output terminal V12 of the inverting unit 163. A third leg comprises switches S75 and S76 connected in series across the positive terminal and the negative terminal of the input of the inverting unit 163. The common node of switches S75 and S76 is connected to a third output terminal V13 of the inverting unit 163. The operating principle of the three-phase inverter shown in FIG. 16 is well known, and hence is not discussed herein.

As shown in FIG. 16, diodes D71-D76 are required to provide reverse conducting paths. In other words, diodes D71-D76 are anti-parallel diodes. In some embodiments, diodes D71-D76 are co-packaged with their respective IGBT devices S71-S76. In alternative embodiments, didoes D71-D76 are placed outside their respective IGBT devices S71-S76.

Figure 17:
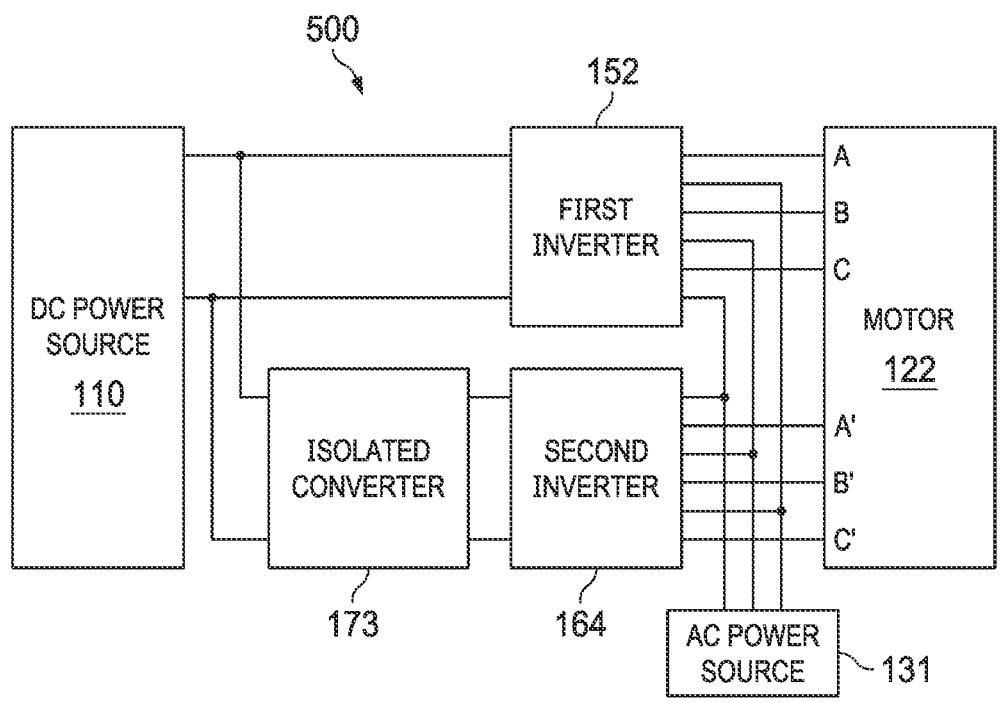
FIG. 17 illustrates a block diagram of a fourth implementation of the power conversion system shown in FIG. 1 in accordance with various embodiments of the present disclosure.

FIG. 17 illustrates a block diagram of a fourth implementation of the power conversion system shown in FIG. 1 in accordance with various embodiments of the present disclosure. The power conversion system 500 shown in FIG. 17 is similar to the power conversion system 200 shown in FIG. 2 except that the isolated converter has a single output, and both the first inverter 152 and the second inverter 164 include three inverting units. Furthermore, the motor 122 is implemented as an open-phase winding motor.

As shown in FIG. 17, the first inverter 152 has six outputs. A first output of the first inverter 152 is connected to winding terminal A of the motor 122. A second output of the first inverter 152 is connected to a first output of the second inverter 164 and further connected to a first phase of the AC power source 131. A third output of the first inverter 152 is connected to winding terminal B of the motor 122. A fourth output of the first inverter 152 is connected to a third output of the second inverter 164 and further connected to a second phase of the AC power source 131. A fifth output of the first inverter 152 is connected to winding terminal C of the motor 122. A sixth output of the first inverter 152 is connected to a fifth output of the second inverter 164 and further connected to a third phase of the AC power source 131. A second output of the second inverter 164 is connected to winding terminal A'. A fourth output of the second inverter 164 is connected to winding terminal B'. A sixth output of the second inverter 164 is connected to winding terminal C'.

It should be noted that winding terminals A and A' are two terminals of a first open-phase winding of the motor 122. Winding terminals B and B' are two terminals of a second open-phase winding of the motor 122. Winding terminals C and C' are two terminals of a first open-phase winding of the motor 122. The detailed structure of the motor 122 will be described below with respect to FIG. 18.

Figure 18A:
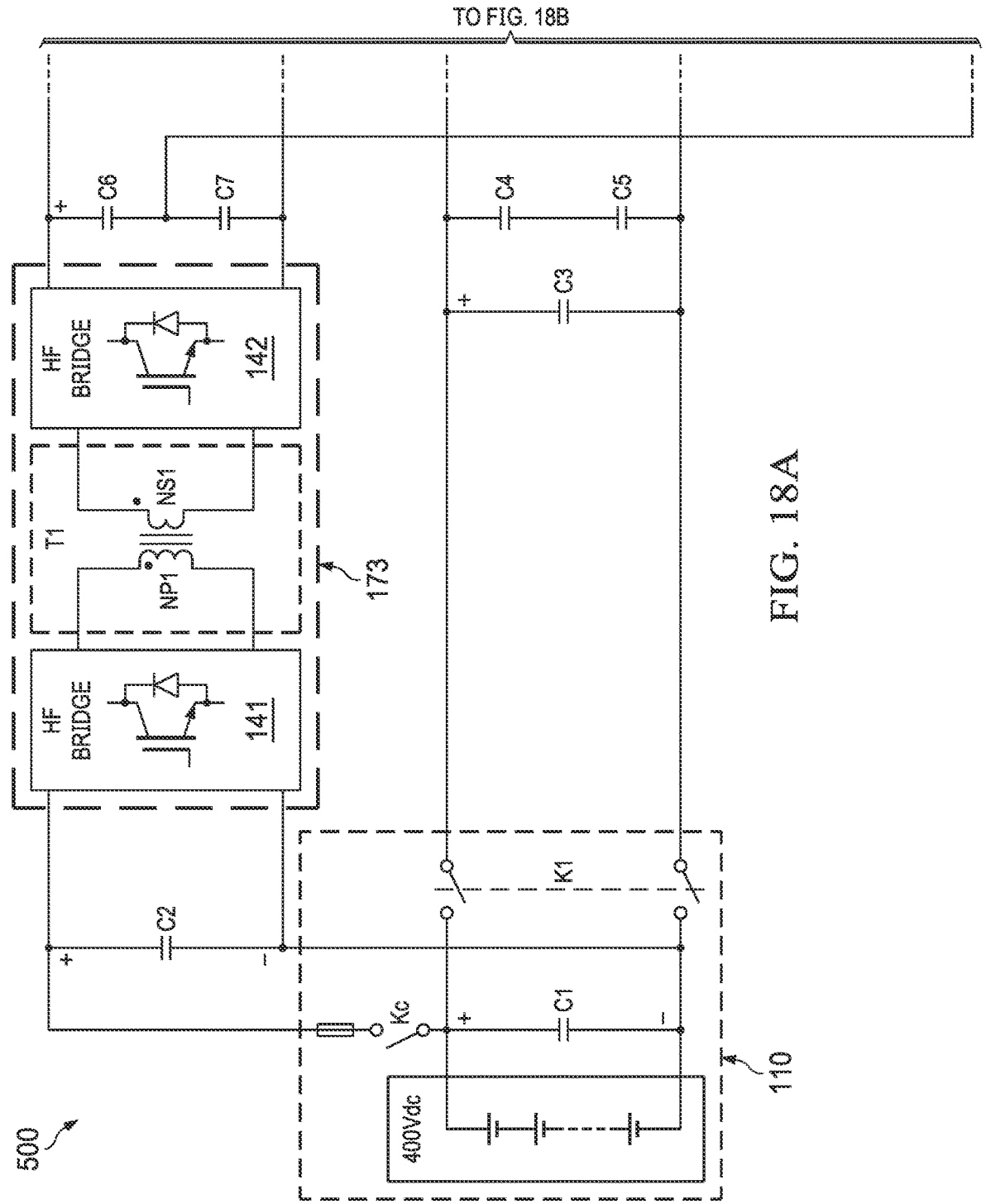
FIGS. 18A and 18B illustrate a schematic diagram of the power conversion system shown in FIG. 17 in accordance with various embodiments of the present disclosure.
Figure 18B:
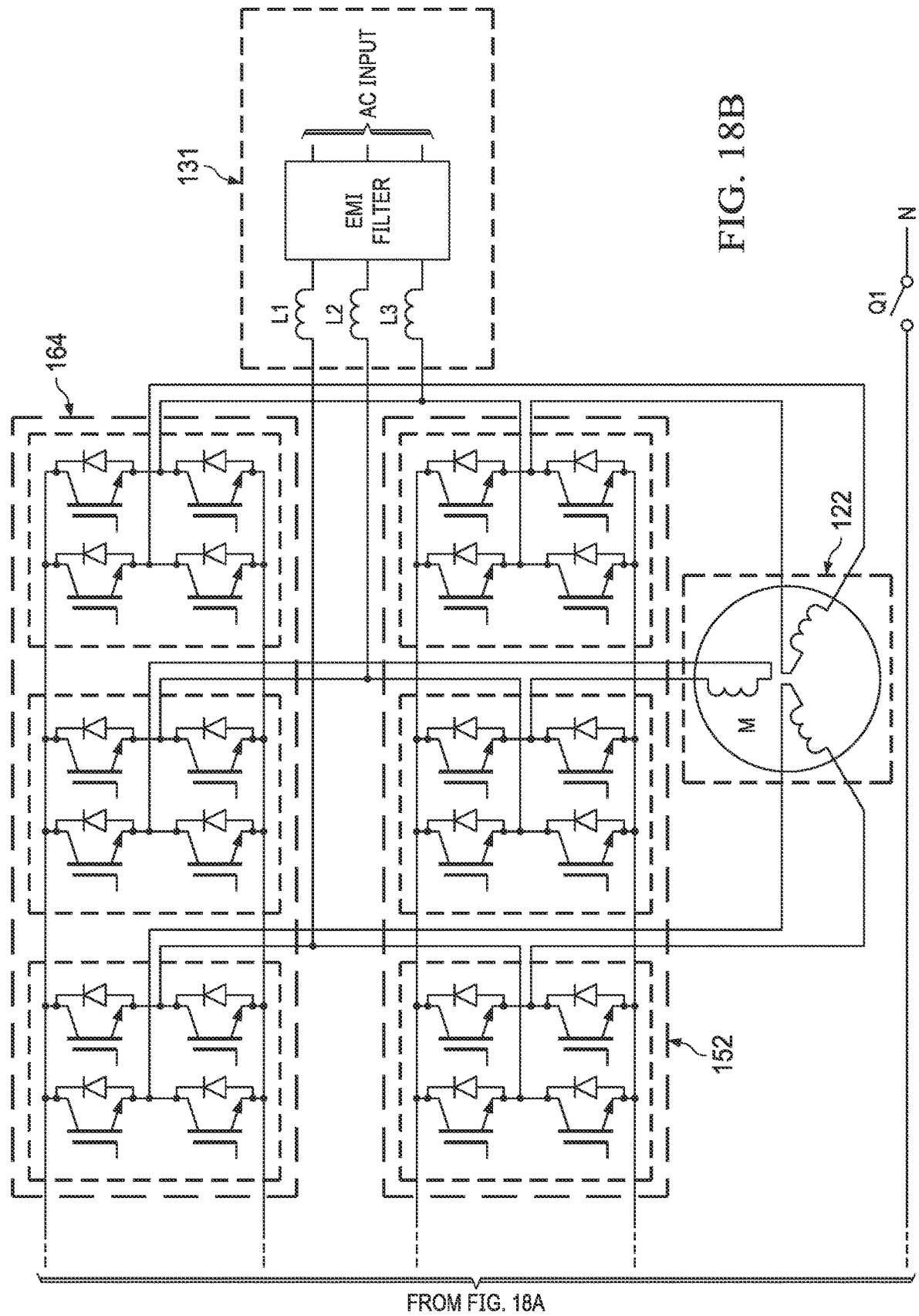

FIG. 18A and FIG. 18B illustrate a schematic diagram of the power conversion system shown in FIG. 17 in accordance with various embodiments of the present disclosure. Throughout the description, FIG. 18A and FIG. 18B are collectively referred to as FIG. 18. The power conversion system 500 is similar to the power conversion system 200 shown in FIG. 3. As such, the identical portions of these two systems are not discussed again to avoid repetition.

The first inverter 152 includes three inverting units connected in parallel between a positive terminal of the capacitor C3 and a negative terminal of the capacitor C3. Each inverting unit of the first inverter 152 is a single-phase inverter having two outputs. The first inverter 152 is a three-phase inverter having six outputs.

The second inverter 164 includes three inverting units connected in parallel between a positive terminal of the capacitor C6 and a negative terminal of the capacitor C7. Each inverting unit of the second inverter 164 is a single-phase inverter having two outputs. The second inverter 164 is a three-phase inverter having six outputs.

A first output of a first inverting unit of the first inverter 152 is connected to a first output of the first inverting unit of the second inverter 164 and a first phase of the AC power source 131. A second output of the first inverting unit of the first inverter 152 and a second output of the first inverting unit of the second inverter 164 are connected to two terminals of a first open-phase winding of the motor 122, respectively.

A first output of a second inverting unit of the first inverter 152 is connected to a first output of the second inverting unit of the second inverter 164 and a second phase of the AC power source 133. A second output of the second inverting unit of the first inverter 152 and a second output of the second inverting unit of the second inverter 164 are connected to two terminals of a second open-phase winding of the motor 122, respectively.

A first output of a third inverting unit of the first inverter 152 is connected to a first output of the third inverting unit of the second inverter 164 and a third phase of the AC power source 133. A second output of the third inverting unit of the first inverter 152 and a second output of the third inverting unit of the second inverter 164 are connected to two terminals of a third open-phase winding of the motor 122, respectively.

The AC power source 131 may be a three-phase AC power source. In some embodiments, the output voltage of the AC power source 131 is in a range from about 220 V to about 240 V. Alternatively, depending on different design needs, the AC power source 131 may be implemented as a two-phase power source or a single-phase power source.

Figure 19:
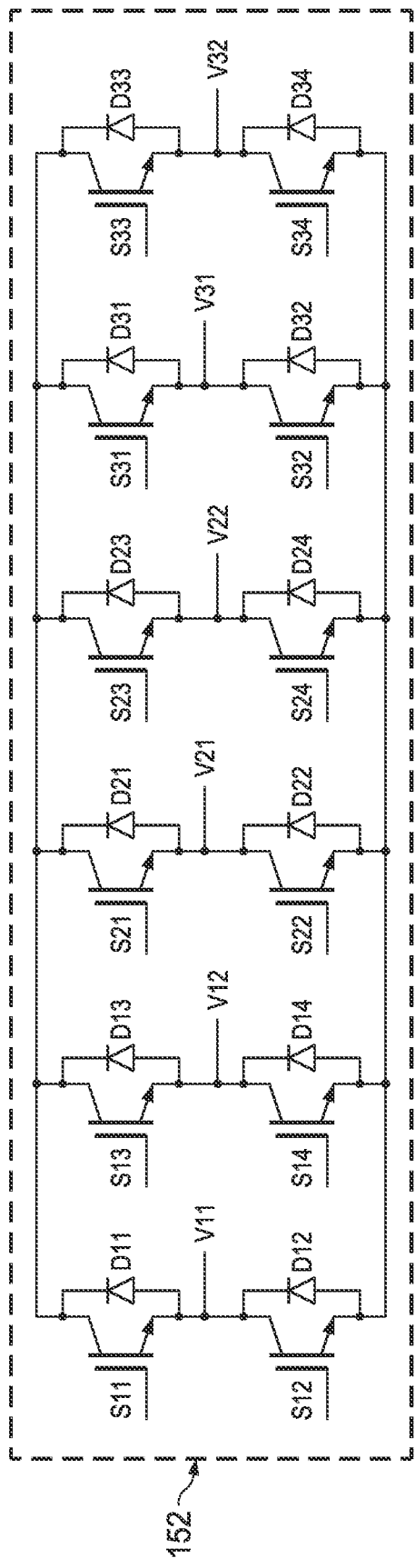
FIG. 19 illustrates a schematic diagram of the first inverter shown in FIG. 18 in accordance with various embodiments of the present disclosure.

FIG. 19 illustrates a schematic diagram of the first inverter shown in FIG. 18 in accordance with various embodiments of the present disclosure. The first inverter 152 is a three-phase inverter configured to convert a DC voltage into three AC waveforms. The first inverter 152 comprises three inverting units. The switches of the first inverter 152 form six legs. A first leg comprises switches S11 and S12 connected in series across a positive terminal and a negative terminal of the input of the first inverter 152. The common node of switches S11 and S12 is connected to a first output terminal V11 of the first inverter 152. A second leg comprises switches S13 and S14 connected in series across the positive terminal and the negative terminal of the input of the first inverter 152. The common node of switches S13 and S14 is connected to a second output terminal V12 of the first inverter 152. The first leg and the second leg form the first inverting unit of the first inverter 152.

A third leg comprises switches S21 and S22 connected in series across the positive terminal and the negative terminal of the input of the first inverter 152. The common node of switches S21 and S22 is connected to a third output terminal V21 of the first inverter 152. A fourth leg comprises switches S23 and S24 connected in series across the positive terminal and the negative terminal of the input of the first inverter 152. The common node of switches S23 and S24 is connected to a fourth output terminal V22 of the first inverter 152. The third leg and the fourth leg form the second inverting unit of the first inverter 152.

A fifth leg comprises switches S31 and S32 connected in series across the positive terminal and the negative terminal of the input of the first inverter 152. The common node of switches S31 and S32 is connected to a fifth output terminal V31 of the first inverter 152. A sixth leg comprises switches S33 and S34 connected in series across the positive terminal and the negative terminal of the input of the first inverter 152. The common node of switches S33 and S34 is connected to a sixth output terminal V32 of the first inverter 152. The fifth leg and the sixth leg form the third inverting unit of the first inverter 152. The operating principle of the three-phase inverter shown in FIG. 19 is well known, and hence is not discussed herein.

As shown in FIG. 19, diodes D11-D14, D21-D24 and D31-D34 are required to provide reverse conducting paths. In other words, diodes D11-D14, D21-D24 and D31-D34 are anti-parallel diodes.

Figure 20:
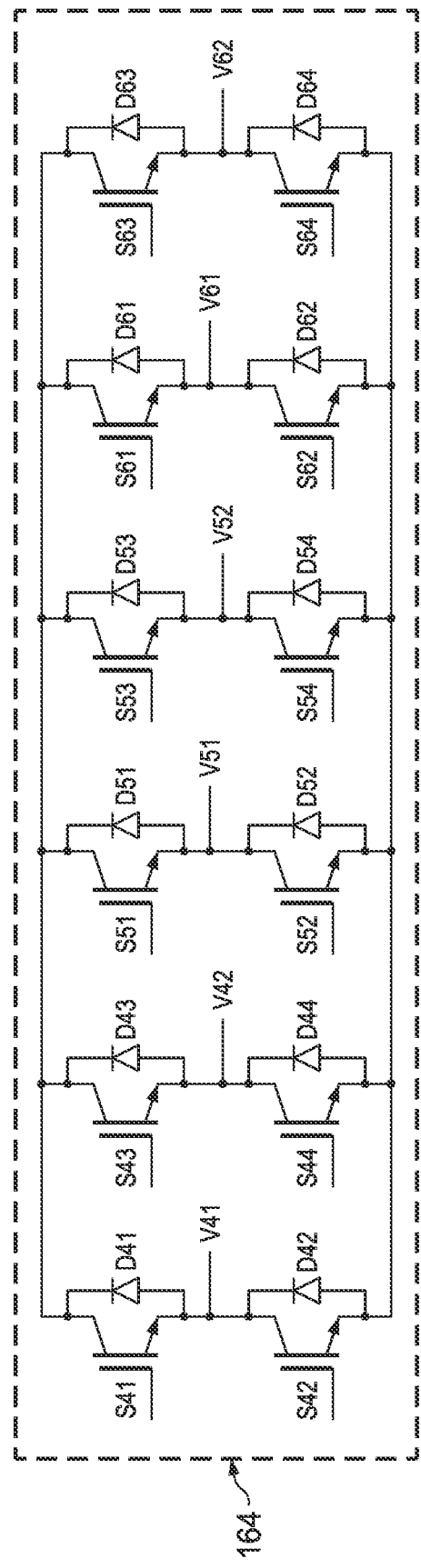
FIG. 20 illustrates a schematic diagram of the second inverter shown in FIG. 18 in accordance with various embodiments of the present disclosure.

FIG. 20 illustrates a schematic diagram of the second inverter shown in FIG. 18 in accordance with various embodiments of the present disclosure. The second inverter 164 comprises switches S41-S44, S51-S54 and S61-S64. The second inverter 164 further comprises diodes D41-D44, D51-D54 and D61-D64. The structure of the second inverter 164 is similar to that of the first inverter 152, and hence is not discussed again herein.

Figure 21:
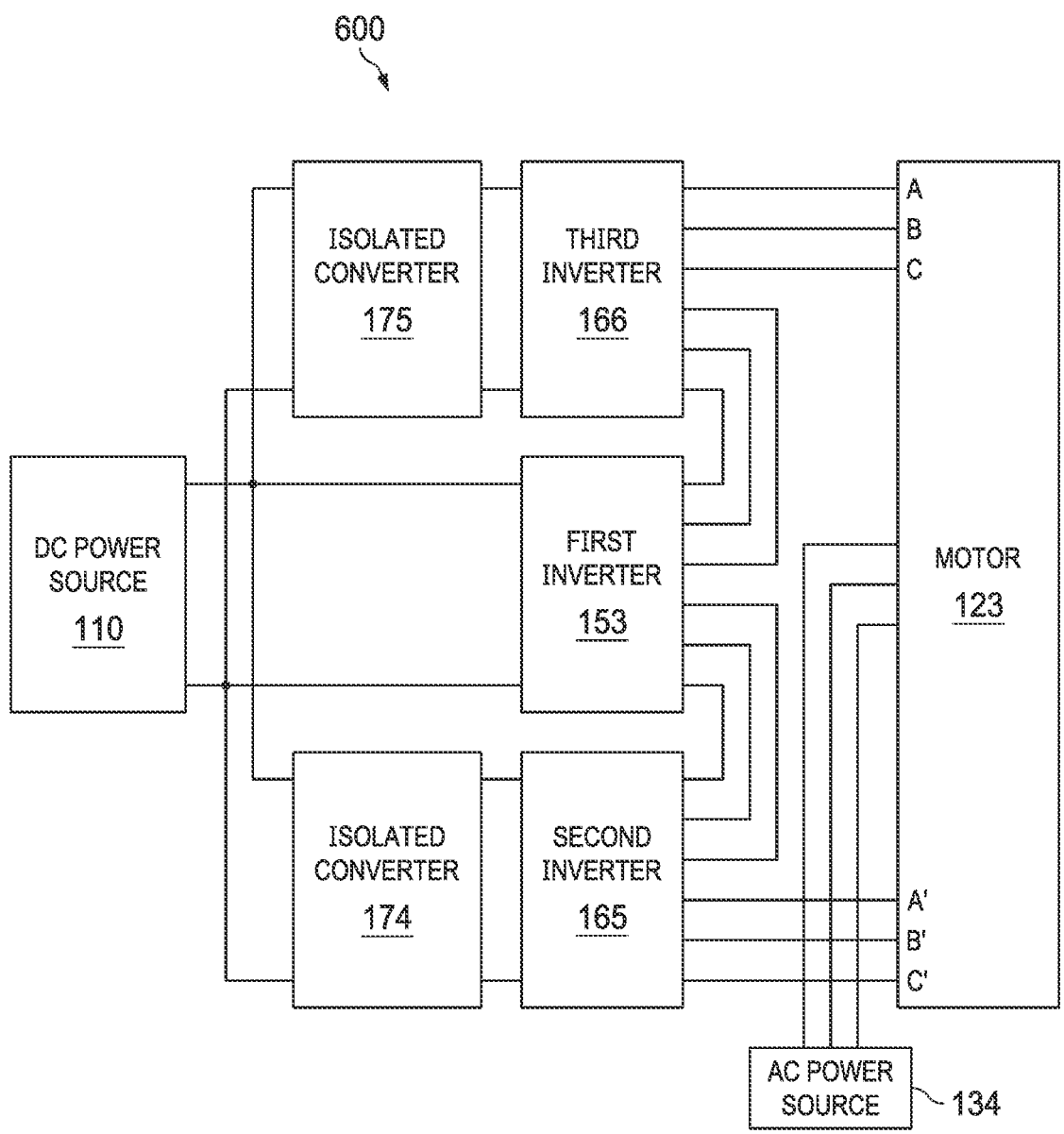
FIG. 21 illustrates a block diagram of a fifth implementation of the power conversion system shown in FIG. 1 in accordance with various embodiments of the present disclosure.

FIG. 21 illustrates a block diagram of a fifth implementation of the power conversion system shown in FIG. 1 in accordance with various embodiments of the present disclosure. The power conversion system 600 shown in FIG. 21 is similar to the power conversion system 500 shown in FIG. 17 except that three inverters are connected in series for driving the motor 123.

As shown in FIG. 21, a first inverter 153 is connected to the DC power source 110 directly. A second inverter 165 is connected to the DC power source 110 through a first isolated converter 174. A third inverter 166 is connected to the DC power source 110 through a second isolated converter 175. The first isolated converter 174 and the second isolated converter 175 are employed to provide isolated power for the second inverter 165 and the third inverter 166, respectively. As a result of having the isolated power, the outputs of the three inverters can be added together to achieve a higher voltage.

Each inverter shown in FIG. 21 has six outputs. Three outputs of the third inverter 166 are connected to winding terminals A, B and C, respectively. The other three outputs of the third inverter 166 are connected to three outputs of the first inverter 153, respectively. The other three outputs of the first inverter 153 are connected to three outputs of the second inverter 165, respectively. The other three outputs of the second inverter 165 are connected to winding terminals A', B' and C', respectively. The three outputs of the AC power source 134 are connected to the three windings of the motor 123, respectively.

Figure 22A:
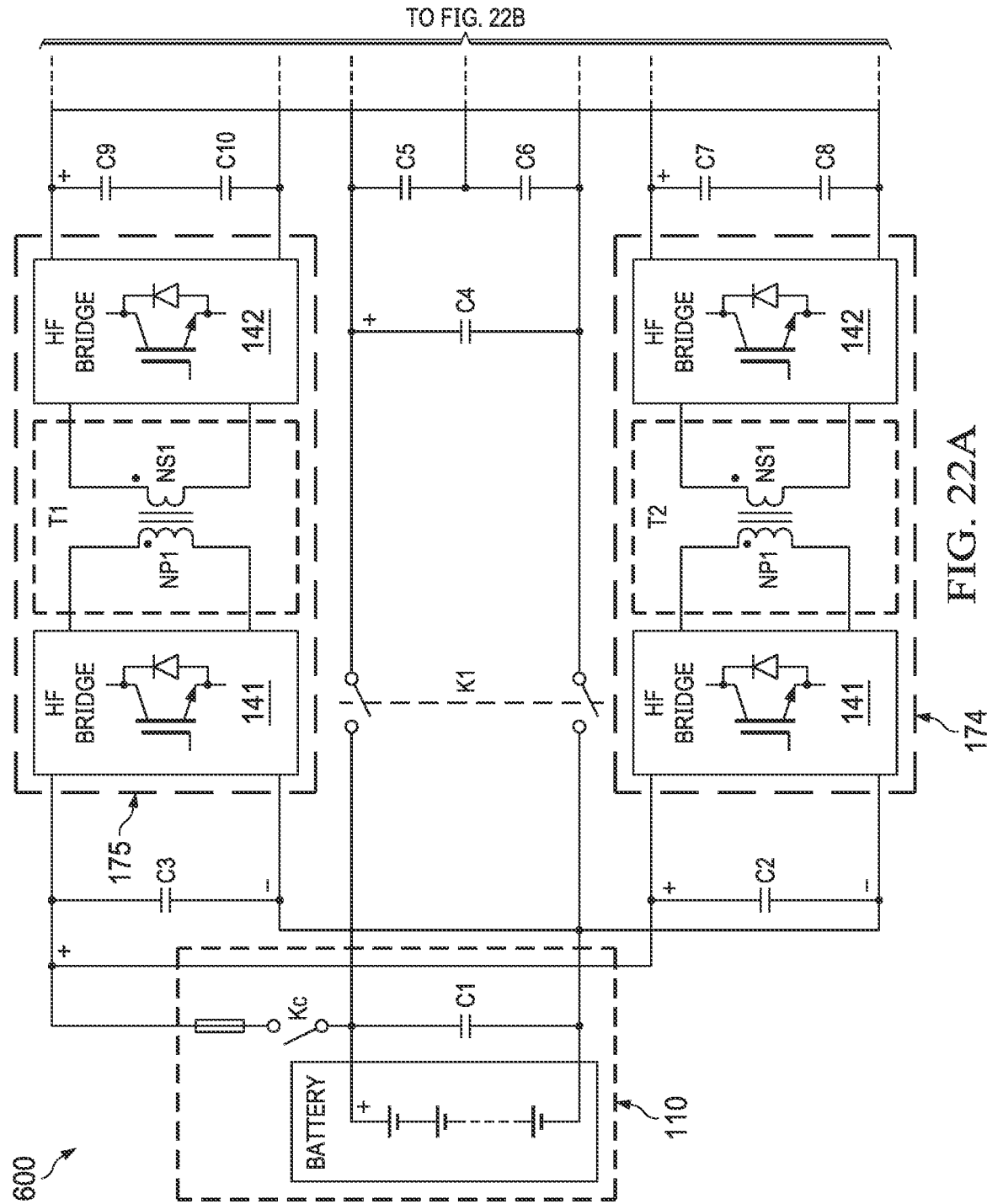
Figure 22C:
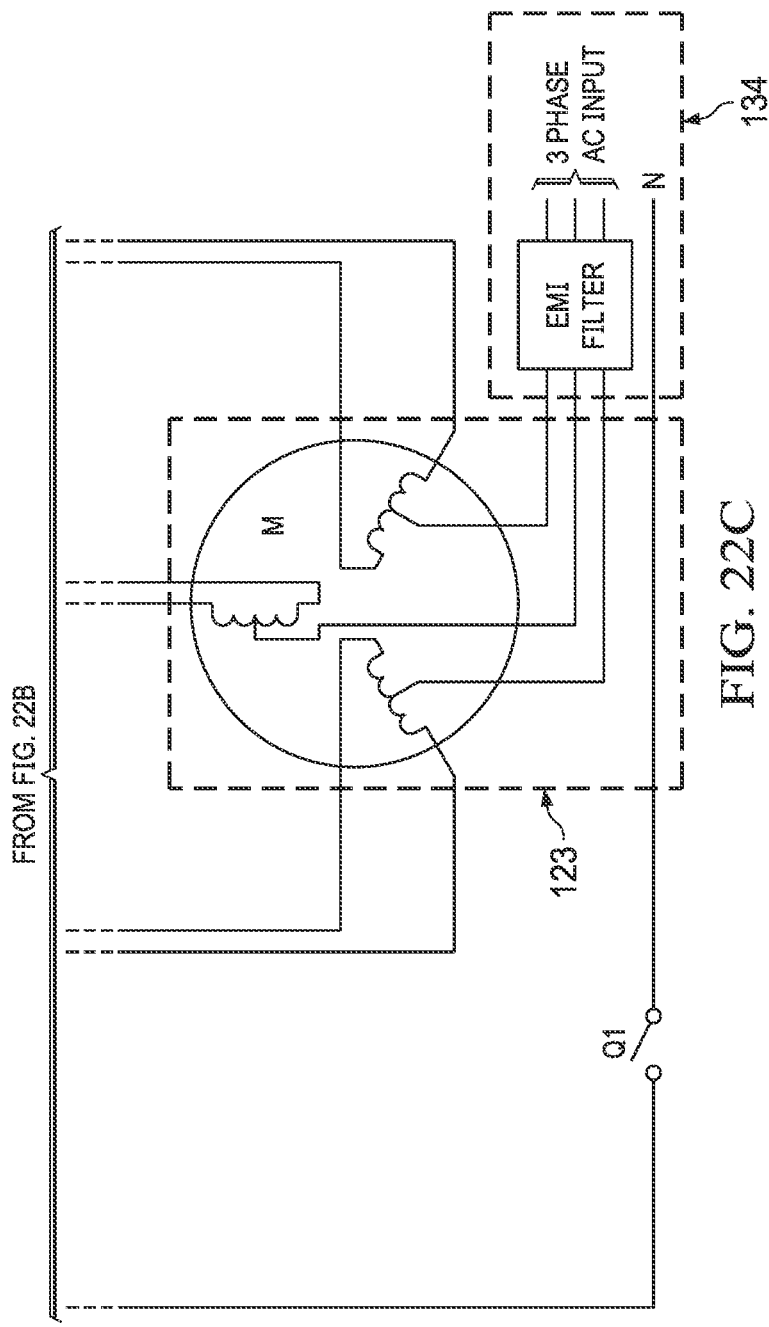

FIG. 22A, FIG. 22B and FIG. 22C illustrate a schematic diagram of the power conversion system shown in FIG. 21 in accordance with various embodiments of the present disclosure. Throughout the description, FIG. 22A, FIG. 22B and FIG. 22C are collectively referred to as FIG. 22. The power conversion system 600 is similar to the power conversion system 500 shown in FIG. 18. As such, the identical portions of these two systems are not discussed again to avoid repetition.

The power conversion system 600 comprises two isolated converters 174 and 175. A first isolated converter 174 has inputs connected to the DC power source 110 through the switch Kc. The capacitor C2 is an input capacitor for providing a steady DC voltage. The capacitors C7 and C8 are output capacitors. As shown in FIG. 22, the capacitors C7 and C8 are connected in series.

A second isolated converter 175 has inputs connected to the DC power source 110 through the switch Kc. The capacitor C3 is an input capacitor for providing a steady DC voltage. The capacitors C9 and C10 are output capacitors. As shown in FIG. 22, the capacitors C9 and C10 are connected in series.

The power conversion system 600 comprises three inverters 153, 165 and 166. The outputs of the three inverters are connected in series to drive the motor 123. The AC power source 134 has three outputs, which are connected to midpoints of the three open-phase windings of the motor 123, respectively as shown in FIG. 22.

Figure 23:
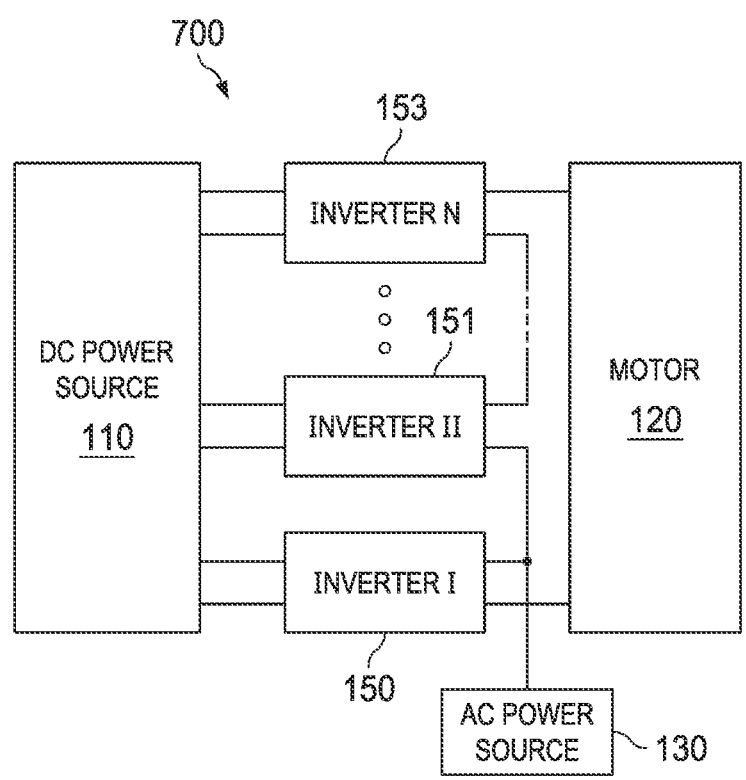
FIG. 23 illustrates a block diagram of a sixth implementation of the power conversion system shown in FIG. 1 in accordance with various embodiments of the present disclosure.

FIG. 23 illustrates a block diagram of a sixth implementation of the power conversion system shown in FIG. 1 in accordance with various embodiments of the present disclosure. The power conversion system 700 shown in FIG. 23 includes a plurality of inverters 150, 151 and 153. The outputs of the plurality of inverters are connected in series to drive a motor 120. The various embodiments discussed in FIGS. 2-22 are applicable to the power conversion system 700 shown in FIG. 23.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system comprising:
   a first power conversion device connected to a first power source;
   a first isolated power conversion device connected to the first power source; and
   a second power conversion device connected to the first isolated power conversion device, wherein outputs of the first power conversion device and outputs of the second power conversion device are connected in series and configured to drive a motor,
   wherein the first power conversion device is a first inverter comprising a first inverting unit, a second inverting unit and a third inverting unit connected in parallel, and wherein each inverting unit of the first inverter includes two output terminals;
   wherein the second power conversion device comprises a second inverter comprising a fourth inverting unit, a fifth inverting unit and a sixth inverting unit connected in parallel, and wherein each inverting unit of the second inverter includes two output terminals,
      wherein two output terminals of the first inverting unit and two output terminals of the fourth inverting unit of the second inverter are connected in series and further connected to a first phase of the motor,
      wherein two output terminals of the second inverting unit and two output terminals of the fifth inverting unit of the second inverter are connected in series and further connected to a second phase of the motor, and
      wherein two output terminals of the third inverting unit and two output terminals of the sixth inverting unit of the second inverter are connected in series and further connected to a third phase of the motor;
   wherein a common node of the first inverting unit and the fourth inverting unit is configured to be connected to a first phase of a three-phase power source;
   wherein a common node of the second inverting unit and the fifth inverting unit is configured to be connected to a second phase of the three-phase power source; and wherein a common node of the third inverting unit and the sixth inverting unit is configured to be connected to a third phase of the three-phase power source, and wherein the three-phase power source is configured to charge the first power source through a power factor correction device formed by windings of the motor and switches of the second inverter.

2. The system of claim 1, wherein the first isolated power conversion device is a three-level inductor-inductor-capacitor (LLC) converter.

3. The system of claim 1, wherein the first isolated power conversion device comprises a first primary switching network, a first resonant tank, a first transformer and a secondary rectifier connected in cascade.

4. The system of claim 1, wherein the first isolated power conversion device comprises a first primary switching network, a first resonant tank, a first transformer, a second primary switching network, a second resonant tank, a second transformer and a secondary rectifier,
wherein the first primary switching network, the first resonant tank and a primary winding of the first transformer are connected in cascade,
wherein the second primary switching network, the second resonant tank and a primary winding of the second transformer are connected in cascade, and
wherein a secondary winding of the first transformer and a secondary winding of the second transformer are connected in series and further connected to the secondary rectifier.

5. The system of claim 1, wherein the first isolated power conversion device comprises a first primary switching network, a first resonant tank, a first transformer, and a plurality of secondary rectifiers, and wherein the plurality of secondary rectifiers is configured to provide isolated power for a plurality of inverting units of the second power conversion device.

6. The system of claim 1, wherein the first power conversion device is the first inverter having three legs and three output terminals;
wherein a first terminal of the first inverter is connected in series with outputs of the first inverting unit and further connected to the first phase of the motor;
wherein a second terminal of the first inverter is connected in series with outputs of the second inverting unit and further connected to the second phase of the motor; and
wherein a third terminal of the first inverter is connected in series with outputs of the third inverting unit and further connected to the third phase of the motor.

7. The system of claim 6, wherein the first isolated power conversion device is an LLC converter comprising a primary winding, a first secondary winding, a second secondary winding and a third secondary winding,
wherein the primary winding is connected to the first power source through a primary switching network,
wherein the first secondary winding is connected to the first inverting unit through a first rectifier,
wherein the second secondary winding is connected to the second inverting unit through a second rectifier, and
wherein the third secondary winding is connected to the third inverting unit through a third rectifier.

8. The system of claim 1, wherein the first power conversion device is the first inverter having three legs and three output terminals, and
wherein the second power conversion device comprises the fourth inverting unit having two legs and the fifth inverting unit having two legs, a first output terminal of the first inverter being both connected to the first phase of the motor and connected in series with outputs of the first inverting unit, a second output terminal of the first inverter being both connected to the second phase of the motor and connected in series with outputs of the second inverting unit, and a third output terminal of the first inverter being connected directly to the third phase of the motor.

9. The system of claim 1, wherein the first power conversion device is the first inverter having three legs and three output terminals; and
wherein the second power conversion device comprises the fourth inverting unit having three legs and the fifth inverting unit having three legs,
wherein a first output terminal of the first inverter is connected in series with outputs of the first inverting unit and further connected to the first phase of the motor,
wherein a second output terminal of the first inverter is connected in series with outputs of the second inverting unit and further connected to the second phase of the motor, and
wherein a third output terminal of the first inverter is connected to the third phase of the motor directly.

10. The system of claim 1,
wherein the second power conversion device further comprises a third inverter, the third inverter comprising a seventh inverting unit, an eighth inverting unit, and a ninth inverting unit connected in parallel, each inverting unit of the third inverter including two output terminals,
wherein the two output terminals of the first inverting unit, the two output terminals of the fourth inverting unit, and two output terminals of the seventh inverting unit are connected in series and further connected to the first phase of the motor,
wherein the two output terminals of the second inverting unit, the two output terminals of the fifth inverting unit, and two output terminals of the eighth inverting unit are connected in series and further connected to the second phase of the motor, and
wherein two output terminals of the third inverting unit, two output terminals of the sixth inverting unit and two output terminals of the ninth inverting unit are connected in series and further connected to the third phase of the motor.

11. A system comprising:
a first inverter having inputs connected to a battery;
an isolated power converter having inputs connected to the battery; and
a second inverter having inputs connected to outputs of the isolated power converter, and outputs connected in series with outputs of the first inverter, wherein series-connected outputs of the first inverter and the second inverter are configured to drive a motor,
wherein the first inverter comprises a first inverting unit, a second inverting unit, and a third inverting unit connected in parallel, and wherein each inverting unit of the first inverter includes two output terminals;
wherein the second inverter comprises a fourth inverting unit, a fifth inverting unit, and a sixth inverting unit connected in parallel, and wherein each inverting unit of the second inverter includes two output terminals,
wherein two output terminals of the first inverting unit and two output terminals of the fourth inverting unit of the second inverter are connected in series and further connected to a first phase of the motor, wherein two output terminals of the second inverting unit and two output terminals of the fifth inverting unit of the second inverter are connected in series and further connected to a second phase of the motor, and wherein two output terminals of the third inverting unit and two output terminals of the sixth inverting unit of the second inverter are connected in series and further connected to a third phase of the motor;

wherein a common node of the first inverting unit and the fourth inverting unit is configured to be connected to a first phase of a three-phase power source;

wherein a common node of the second inverting unit and the fifth inverting unit is configured to be connected to a second phase of the three-phase power source; and wherein a common node of the third inverting unit and the sixth inverting unit is configured to be connected to a third phase of the three-phase power source, and wherein the three-phase power source is configured to charge the battery through a power factor correction device formed by windings of the motor and switches of the second inverter.

12. The system of claim 11, wherein during a charging process of the battery, windings of the motor are configured to operate as inductors of a three-phase power factor correction converter.

13. The system of claim 11, wherein the first inverter is a three-phase full-bridge inverter comprising three output terminals;
wherein a first output terminal of the first inverter is connected in series with outputs of the fourth inverting unit and further connected to the first phase of the motor;
wherein a second output terminal of the first inverter is connected in series with outputs of the fifth inverting unit and further connected to the second phase of the motor; and
wherein a third output terminal of the first inverter is connected in series with outputs of the sixth inverting unit and further connected to the third phase of the motor.

14. The system of claim 13, wherein the isolated power converter is an inductor-inductor-capacitor (LLC) power converter comprising a primary winding, a first secondary winding, a second secondary winding and a third secondary winding,
wherein the primary winding is connected to the battery through a primary switching network,
wherein the first secondary winding is connected to the fourth inverting unit through a first rectifier,
wherein the second secondary winding is connected to the fifth inverting unit through a second rectifier, and
wherein the third secondary winding is connected to the sixth inverting unit through a third rectifier.

15. A method comprising:
driving a motor using a first inverter and a second inverter that are connected in series with one another, the first inverter being connected to a battery, the second inverter being connected to the battery through an isolated power converter; and
charging the battery through a power factor correction device that includes windings of the motor and switches of the second inverter,
wherein the first inverter comprises a first inverting unit, a second inverting unit, and a third inverting unit connected in parallel, and wherein each inverting unit of the first inverter includes two output terminals;

wherein the second inverter comprises a fourth inverting unit, a fifth inverting unit, and a sixth inverting unit connected in parallel, and wherein each inverting unit of the second inverter includes two output terminals,
wherein two output terminals of the first inverting unit and two output terminals of the fourth inverting unit of the second inverter are connected in series and further connected to a first phase of the motor,
wherein two output terminals of the second inverting unit and two output terminals of the fifth inverting unit of the second inverter are connected in series and further connected to a second phase of the motor, and
wherein two output terminals of the third inverting unit and two output terminals of the sixth inverting unit of the second inverter are connected in series and further connected to a third phase of the motor;
wherein a common node of the first inverting unit and the fourth inverting unit is configured to be connected to a first phase of a three-phase power source;
wherein a common node of the second inverting unit and the fifth inverting unit is configured to be connected to a second phase of the three-phase power source; and
wherein a common node of the third inverting unit and the sixth inverting unit is configured to be connected to a third phase of the three-phase power source, and wherein the three-phase power source is configured to charge the battery through the power factor correction device.

16. The method of claim 15, further comprising:
charging the battery using the three-phase power source, wherein the power factor correction device is configured to adjust input currents flowing into the power factor correction device to achieve a power factor that is within a threshold range of unity.

17. The method of claim 15, wherein the first inverter comprises three legs, each of the three legs having an output terminal;
wherein a first output terminal of the first inverter is connected in series with outputs of the fourth inverting unit and further connected to the first phase of the motor;
wherein a second output terminal of the first inverter is connected in series with outputs of the fifth inverting unit and further connected to the second phase of the motor, and
wherein a third output terminal of the first inverter is connected in series with outputs of the sixth inverting unit and further connected to the third phase of the motor; and
wherein the isolated power converter comprises a primary winding, a first secondary winding, a second secondary winding and a third secondary winding,
wherein the primary winding is connected to the battery through a primary switching network,
wherein the first secondary winding is connected to the fourth inverting unit through a first rectifier,
wherein the second secondary winding is connected to the fifth inverting unit through a second rectifier, and
wherein the third secondary winding is connected to the sixth inverting unit through a third rectifier.

18. The method of claim 17, further comprising:
charging the battery using the three-phase power source, wherein the three-phase power source is connected to the fourth inverting unit through an EMI filter and a first inductor, wherein the three-phase power source is connected to the fifth inverting unit through the EMI filter and a second inductor, and wherein the three-phase power source is connected to the sixth inverting unit through the EMI filter and a third inductor.

\* \* \* \* \*